(12) United States Patent
Turner et al.

(10) Patent No.: US 11,106,688 B2
(45) Date of Patent: Aug. 31, 2021

(54) BITMAP INDEX INCLUDING INTERNAL METADATA STORAGE

(71) Applicant: Molecula Corp., Austin, TX (US)

(72) Inventors: Travis Turner, Austin, TX (US); Todd Wesley Gruben, Cedar Park, TX (US); Ben Johnson, Denver, CO (US); Cody Stephen Soyland, Austin, TX (US); Higinio O. Maycotte, Austin, TX (US)

(73) Assignee: Molecula Corp., Austin, TX (US)

( * ) Notice: Subject to any disclaimer, the term of this patent is extended or adjusted under 35 U.S.C. 154(b) by 0 days.

(21) Appl. No.: 16/827,323

(22) Filed: Mar. 23, 2020

(65) Prior Publication Data

US 2020/0327135 A1    Oct. 15, 2020

Related U.S. Application Data

(63) Continuation of application No. 15/717,665, filed on Sep. 27, 2017, now Pat. No. 10,599,661, which is a continuation of application No. 15/283,918, filed on Oct. 3, 2016, now Pat. No. 9,805,100, which is a continuation of application No. 15/143,139, filed on Apr. 29, 2016, now Pat. No. 9,489,410.

(51) Int. Cl.
| | | |
|---|---|---|
| *G06F 16/22* | (2019.01) | |
| *G06F 16/2457* | (2019.01) | |
| *G06F 7/24* | (2006.01) | |
| *G06F 16/248* | (2019.01) | |
| *G06F 16/9535* | (2019.01) | |
| *G06F 16/2455* | (2019.01) | |
| *G06F 16/901* | (2019.01) | |

(52) U.S. Cl.
CPC .......... *G06F 16/24578* (2019.01); *G06F 7/24* (2013.01); *G06F 16/2237* (2019.01); *G06F 16/248* (2019.01); *G06F 16/24561* (2019.01); *G06F 16/901* (2019.01); *G06F 16/9535* (2019.01)

(58) Field of Classification Search
CPC .................................................. G06F 16/2237
See application file for complete search history.

(56) References Cited

U.S. PATENT DOCUMENTS

| 5,899,988 A | 5/1999 | Depledge et al. |
|---|---|---|
| 2016/0026579 A1 | 1/2016 | Samanta et al. |

*Primary Examiner* — Kris E Mackes
(74) *Attorney, Agent, or Firm* — Kowert, Hood, Munyon, Rankin & Goetzel, P.C.

(57) ABSTRACT

A method includes receiving a first signal and updating a bitmap index responsive to the first signal. The bitmap index includes a plurality of bit strings, where a value stored in a particular location in each of the bit strings indicates whether a corresponding signal associated with a signal source has been received. Updating the bitmap index responsive to the first signal includes updating a first bit of the bitmap index and updating first metadata values stored in the bitmap index, wherein the first metadata values comprise a plurality of sort index values indicating relative ranks of the first bit string relative to other bit strings. The method also includes outputting query results based on a query, wherein the query results identify one or more signals associated with one or more bit strings of the plurality of bit strings and one or more signal sources of a plurality of signal sources, and wherein the query results are sorted according to one of the first metadata values.

20 Claims, 16 Drawing Sheets

Query: Show me information related to men in my audience that like Coffee Shop A or have made a purchase

702

Male ∩ (Coffee Shop A U Purchase)

250 → Custom Tile Metadata 222

| | | 0 | 1 | ... | ... | Q | Q+1 |
|---|---|---|---|---|---|---|---|
| Male | ... | 0 | 1 | ... | ... | 1 | 1 |
| Income [100-110k] | ... | 1 | 0 | ... | ... | 0 | 1 |
| Single | ... | 0 | 1 | ... | ... | 0 | 1 |
| Coffee Shop A | ... | 0 | 1 | ... | ... | 0 | 0 |
| Clothing Brand D | ... | 0 | 1 | ... | ... | 0 | 1 |
| TV Network C | ... | 1 | 0 | ... | ... | 1 | 0 |
| Watches Video | ... | 1 | 0 | ... | ... | 0 | 0 |
| Purchase | ... | 0 | 1 | ... | ... | 0 | 1 |
| Reads Articles | ... | 0 | 1 | ... | ... | 1 | 0 |

610 — Male row
712 — Coffee Shop A row
714 — Purchase row

Custom Profile Metadata 224

<email, "john@site.com">
...

716 — Filter String | 0 | 1 | .......... | 0 | 1 |

FIG. 7

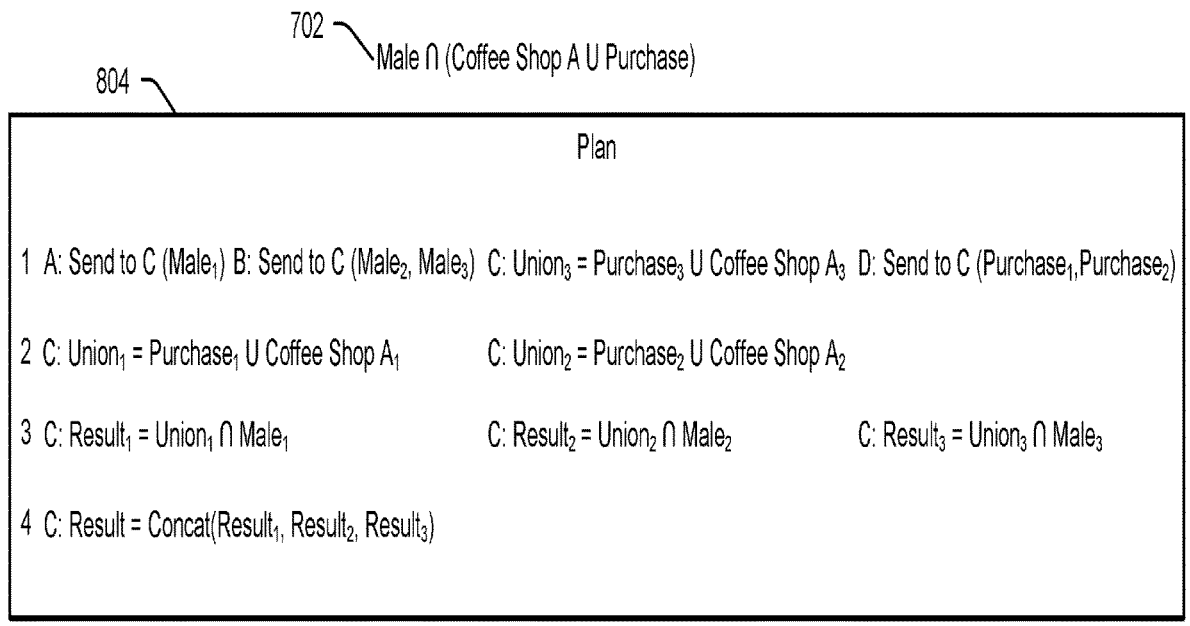
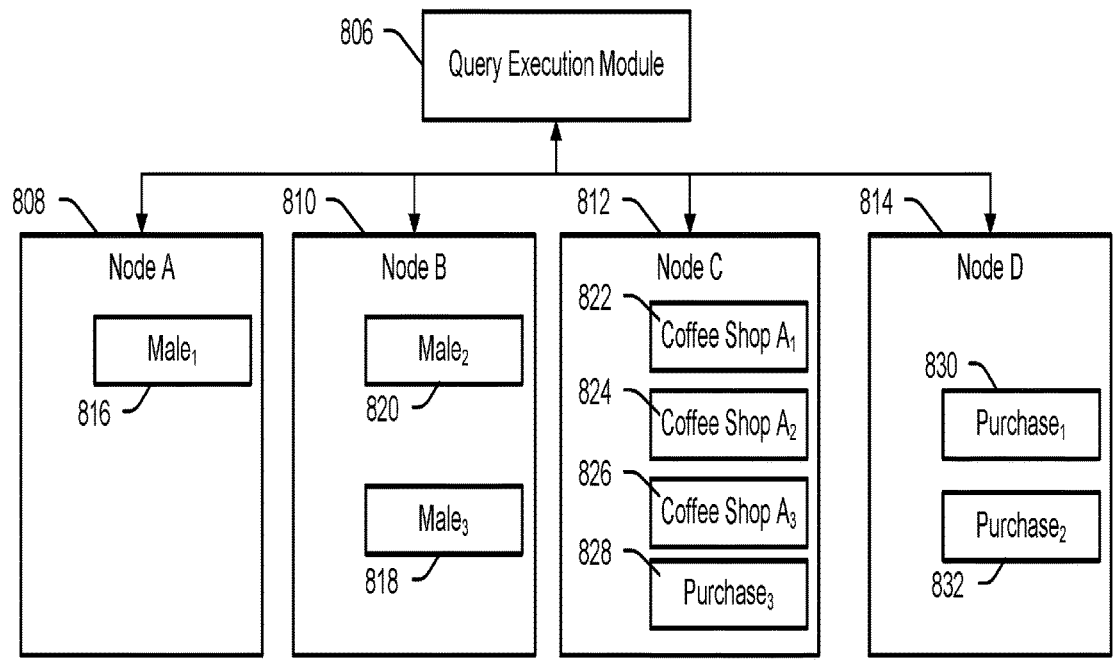
FIG. 8 ns. When the underlying data set is large, the bit strings of the bitmap index may be stored in distributed fashion across multiple network-attached storage nodes, and executing queries on the bitmap index may involve parallel computations on multiple storage nodes. In particular examples, the bitmap index includes metadata name-value pairs. Inclusion of such metadata within the bitmap index may enable generating query results without having to perform lookup operations on external data structures.

BITMAP INDEX INCLUDING INTERNAL METADATA STORAGE

CROSS-REFERENCE TO RELATED APPLICATIONS

The present application is a continuation of U.S. application Ser. No. 15/717,665 filed Sep. 27, 2017 (now U.S. Pat. No. 10,599,661), which is a continuation of U.S. application Ser. No. 15/283,918 filed Oct. 3, 2016 (now U.S. Pat. No. 9,805,100), which is a continuation of U.S. application Ser. No. 15/143,139 filed Apr. 29, 2016 (now U.S. Pat. No. 9,489,410), the disclosures of each of the above-referenced applications are incorporated by reference herein in their entireties.

BACKGROUND

Computer networks, such as public networks (e.g., the Internet) and private networks (e.g., at medical institutions, financial institutions, business enterprises, etc.) have become a medium for research, communication, distribution, and storage of data. Consequently, more and more devices are network-enabled. To illustrate, on any given day, a typical user may access a half-dozen or more network-enabled devices, such as their mobile phone, tablet computer, home security system devices, one or more wearable devices, a home laptop or desktop, a work laptop or desktop, and home entertainment devices (e.g., televisions, game consoles, set top boxes, etc.). Moreover, Internet of Things (IoT) protocols enable network-enabled devices to communicate with each other without user intervention. Thus, there is an increasing amount of data being accessed, transferred, and stored online. As users use networks to access data, they also generate a large amount of data regarding themselves. On websites such as social networks, users actively and willingly share data regarding themselves. Analyzing such large data sets in a timely fashion may be difficult. In addition, because the data sets may be stored in multiple data structures (e.g., tables), querying the data sets may include performing lookup operations on various data structures, which may be inefficient.

SUMMARY

Systems and methods of using a bitmap index are disclosed. The bitmap index may index "big data," such as data related to people that access a media property (e.g., website). A system may track various characteristics of the users based on actions performed by the users on the website, actions performed by the users on other websites, accessing the users' social networking profiles, etc. This "raw" data may be stored in a distributed storage network, and the bitmap index may include bit strings corresponding to the raw data (or a portion thereof). To illustrate, the bitmap index may include a bit string for the demographic property "Male" and a bit string for the demographic property "Age 21-25." The same position in each bit string may correspond to the same user. For example, if a particular user is assigned a user identifier (ID) of N, then the value of the $N^{th}$ bit of the "Male" bit string indicates whether the particular user is male and the value of the $N^{th}$ bit of the "Age 21-25" bit string indicates whether the particular user is between the ages of 21 and 25.

The bitmap index may enable real-time or near-real-time computation of various metrics or queries that combine logical set operations, such as AND, OR, and NOT opera- In accordance with at least one described embodiment, a method includes receiving, at a computing device including a processor, a query directed to a bitmap index. The bitmap index includes a plurality of bit strings, where a value stored in a particular location in each of the bit strings indicates whether a corresponding signal associated with a signal source (e.g., a user, a computing device associated with the user, or a computing device not associated with any user, such as an IoT device) has been received, and where the bitmap index includes at least a first metadata value associated with each of the bit strings, at least a second metadata value associated with each of a plurality of signal sources, or both. The method also includes generating query results based on the query. The query results identify at least one signal associated with at least one bit string of the plurality of bit strings, at least one signal source of the plurality of signal sources, and at least one of the first metadata value or the second metadata value.

Aspects of the present disclosure may include one or more of the following:
The first metadata value and the second metadata value may be part of respective name-value pairs included in the bitmap index.
The first metadata value may correspond to a count of signal sources for which a corresponding signal has been received.
The first metadata value may correspond to a sort index.
A plurality of bitmap indexes may be associated with a plurality of websites, and the first metadata value may be based on a comparison of a popularity of a signal with respect to a website and a popularity of the signal with respect to the plurality of websites.
The signal source may correspond to a user, a computing device associated with the user, or a computing device not associated with any user.
The second metadata value may correspond to user contact information.
The query results may be sorted based on at least one of the first metadata value or the second metadata value.
The bitmap index may represent data stored in a data store.
The data stored in the data store may be determined based at least in part on event signals received from devices associated with a plurality of users.
One or more of the plurality of bit strings may correspond to a demographic attribute, a behavior, a brand affinity, or a combination thereof.
The bitmap index may be distributed across a plurality of storage devices.
Each of the plurality of bit strings may be stored as one or more distributed slices, where at least a first slice of a particular bit string of the plurality of bit strings is stored in a different storage device than a second slice of the particular bit string.
A query execution plan may be generated for the query, where the query execution plan identifies one or more set operations, that one or more first storage nodes are to send stored portions of one or more bit strings to a second storage node; and that the second storage node is to perform the one or more set operations with respect to: the portions of the one or more bit strings received from the one or more first storage nodes, and portions of one or more bit strings stored at the second storage node. The query execution plan may also identify that the second storage node is to concatenate results of performing the one or more set operations to generate a result bit string that indicates a result of the query.

The query results may be determined without accessing a lookup table that is external to the bitmap index.

In another particular embodiment, an apparatus includes a processor and a memory storing instructions executable by the processor to perform operations including receiving a query directed to a bitmap index. The bitmap index includes a plurality of bit strings, where a value stored in a particular location in each of the bit strings indicates whether a corresponding signal associated with a signal source has been received, and where the bitmap index includes at least a first metadata value associated with each of the bit strings, at least a second metadata value associated with each of a plurality of signal sources, or both. The operations also include generating query results based on the query. The query results identify at least one signal associated with at least one bit string of the plurality of bit strings, at least one signal source of the plurality of signal sources, and at least one of the first metadata value or the second metadata value.

Aspects of the present disclosure may include one or more of the following:
The first metadata value and the second metadata value may be part of respective name-value pairs included in the bitmap index.
The first metadata value may correspond to a count of users for whom a corresponding signal has been received, a sort index, or a comparison of a popularity of a signal with respect to a website and a popularity of the signal with respect to a plurality of websites, and the second metadata value may correspond to user contact information.

In another particular embodiment, a non-transitory computer readable medium stores instructions that, when executed, cause a computer to perform operations including receiving a query directed to a bitmap index. The bitmap index includes a plurality of bit strings, where a value stored in a particular location in each of the bit strings indicates whether a corresponding signal associated with a signal source has been received, and where the bitmap index includes at least a first metadata value associated with each of the bit strings, at least a second metadata value associated with each of a plurality of signal sources, or both. The operations also include generating query results based on the query. The query results identify at least one signal associated with at least one bit string of the plurality of bit strings, at least one signal source of the plurality of signal sources, and at least one of the first metadata value or the second metadata value.

Aspects of the present disclosure may include one or more of the following:
The first metadata value may correspond to a count of users for whom a corresponding signal has been received, a sort index, or a comparison of a popularity of a signal with respect to a website and a popularity of the signal with respect to a plurality of websites, and the second metadata value may correspond to user contact information.

BRIEF DESCRIPTION OF THE DRAWINGS

FIG. 7 is a diagram to illustrate another particular embodiment of a method of using a bitmap index during execution of a query;

FIG. 8 is a diagram to illustrate a particular embodiment of a method of generating a query execution plan corresponding to the query of FIG. 7;

DETAILED DESCRIPTION

Figure 1:
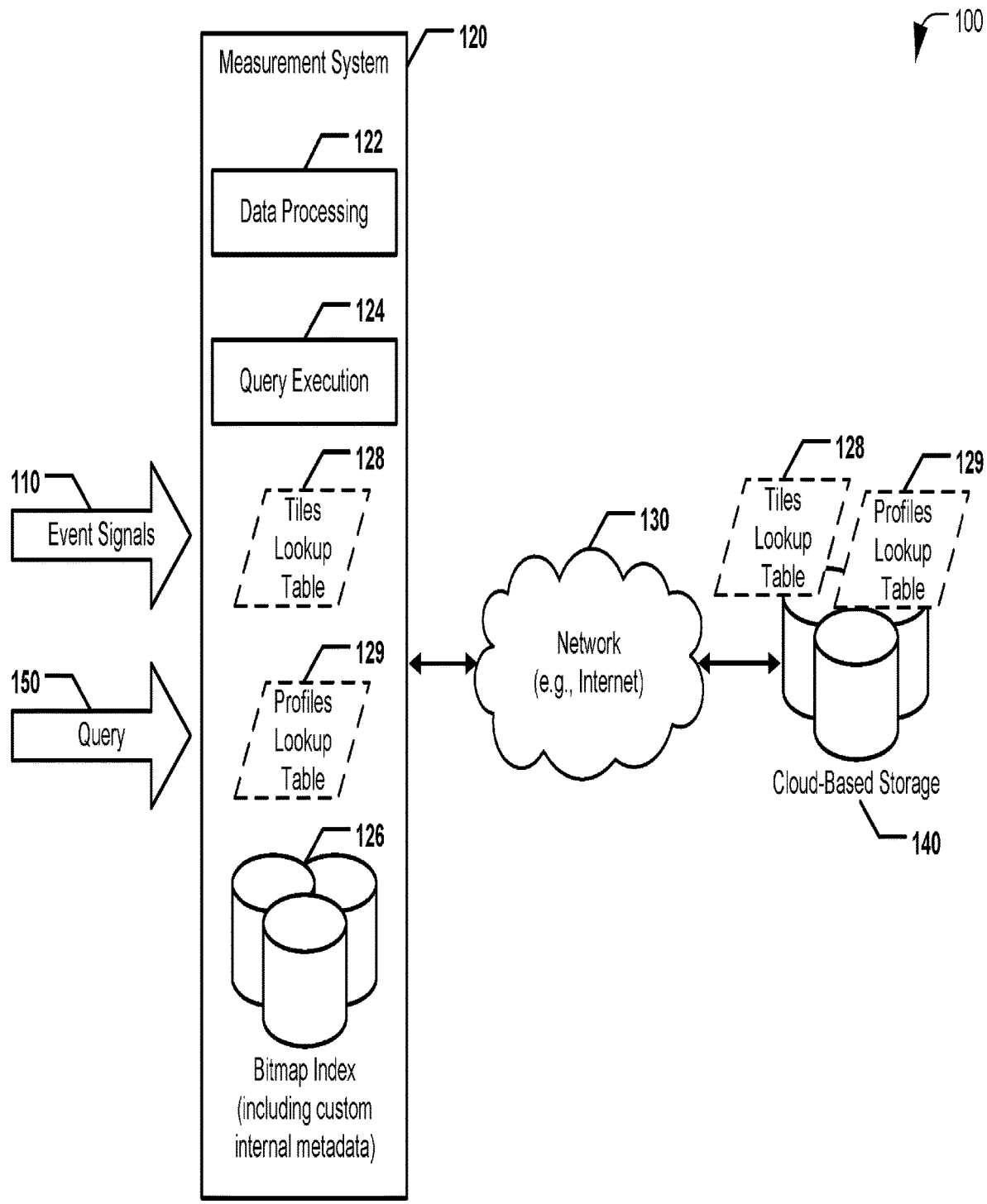
FIG. 1 is a diagram to illustrate a particular embodiment of a system that is operable to use a bitmap index having internal metadata storage.

FIG. 1 illustrates a particular embodiment of a system 100 that is operable to generate and use a bitmap index. A measurement system 120 may be configured to receive event signals 110 associated with the audience of one or more media properties (e.g., websites). The event signals 110 may be received from sources that include, but are not limited to, computing devices, mobile devices, web servers, measurement logs, third-party data sources, and social networks. It is to be understood that although various embodiments may be described herein in the context of audience measurement for media properties (e.g., websites), the present disclosure is not limited as such. A bitmap index may be used to represent data collected in other scenarios, including but not limited to sensor data, data from various Internet of Things (IoT) devices, genomic data, financial data, etc. In some examples, a bitmap index may represent data that is unrelated to Internet use. For example, a bitmap index may be used to represent static data sets that are uploaded to the measurement system 120 offline, and may correspond to data that was not captured/generated digitally, even though such data is represented digitally in the bitmap index. The systems and methods of the present disclosure may thus be agnostic as to the origin and type of data being represented by a bitmap index.

The measurement system 120 may be implemented using one or more computing devices (e.g., servers). For example, such computing devices may include one or more processors or processing logic, memories, and network interfaces. The memories may include instructions executable by the processors to perform various functions described herein. The network interfaces may include wired and/or wireless interfaces operable to enable communication to local area networks (LANs) and/or wide area networks (WANs), such as the Internet. In the illustrated example, the measurement system 120 is communicably coupled to a network 130.

The event signals 110 may include information associated with audience members of a media property. For example, when an audience member creates an account or otherwise registers with a media property using social networking identification, the measurement system 120 may retrieve event signals corresponding to data stored in social networking profiles of the audience member. As another example, the event signals 110 may identify specific interactions by the audience members with respect to the media property (e.g., what action was taken at a media property, when the action was taken, for how long the action was taken, etc.). The interactions may include interactions with advertisements presented by the media property and/or interactions with content presented by the media property. In a particular embodiment, each of the event signals 110 identifies a property (e.g., "Property 1") and an audience member (alternately referred to herein as a "user"). For example, if a user having a user ID=N made a purchase on the website for Property 1, a corresponding event signal received by the measurement system 120 may be "(userID=N, property='Property 1', behavior=Purchase)". In some examples, an event signal may also include metadata regarding an audience member and/or an attribute. In alternate embodiments, a different format may be used to represent an event signal.

The measurement system 120 may include a data processing module 122 and a query execution module 124, each of which may be implemented using instructions executable by one or more processors at the measurement system 120. The data processing module 122 may receive the event signals 110 and store "raw" data corresponding to the event signals 110 (e.g., a copy of the event signals 110) in cloud-based storage 140. The data processing module 122 may also store indexing data for the cloud-based storage 140 in a bitmap index 126. In a particular embodiment, unlike the cloud-based storage 140, the bitmap index 126 may be local (or more quickly accessible) to the measurement system 120. To illustrate, data for the bitmap index 126 may be stored across one or more data storage devices (e.g., nodes) that are part of the measurement system 120 or accessible to the measurement system 120 via a LAN, or other private high-speed network, as opposed to a WAN. Alternatively, or in addition, data of the bitmap index 126 may be stored "in-memory," such as in RAM. Thus, read and write operations with respect to the bitmap index 126 may be faster than corresponding read and write operations with respect to the cloud-based storage 140.

The measurement system 120 may maintain a bitmap index 126 for each media property being measured. Data in the bitmap index 126 may be stored in the form of bit strings. The bitmap index 126 may store bit strings corresponding to at least a subset of the data stored in the cloud-based storage 140. Thus, depending on implementation, the bitmap index 126 may, for a particular media property, include bit strings for all of the data stored in the cloud-based storage 140 or less than all of the data stored in the cloud based storage 140. In a particular embodiment, the bitmap index 126 for a particular media property includes, for each audience member of the media property, data regarding one or more attributes of the audience member, which may include but are not limited to demographic attributes, brand affinities, behaviors (e.g., interactions with the media property), etc. It is to be understood that the techniques of the present disclosure may be used with bitmap indexes having an arbitrary number of rows (e.g., R, where R is an integer greater than or equal to one) and an arbitrary number of columns (e.g., C, where C is an integer greater than or equal to one).

To illustrate, a media property may have a known audience of one hundred thousand registered members. The bitmap index 126 for the media property may include bit strings representing various attributes associated with each of the hundred thousand audience members. Thus, each of the bit strings may be one hundred thousand bits in length. Further, the same location in each bit string may correspond to the same audience member. For example, if the $N^{th}$ location in a "Male" bit string has a value of "1" and the $N^{th}$ location in a "Watches video" bit string has a value of "1," this indicates that the $N^{th}$ audience member (who has a userID=N) is a male that has watched at least one video on the property.

In some examples, the bitmap index 126 for a media property may store bit strings corresponding to less than all of the data stored in the cloud-based storage 140. For example, although the cloud-based storage 140 may include "raw" data corresponding millions of signals (also referred to herein as "tiles"), the bitmap index 126 may store bit strings for a smaller subset of the most popular signals/tiles (e.g., the top fifty thousand signals/tiles). In an alternative embodiment, the bitmap index 126 may store bit strings for all of the signals/tiles tracked in the cloud-based storage 140. Examples of the bitmap index 126 are further described herein. In a particular embodiment, the bitmap index 126 is automatically sorted based on a parameter, such as the total count of asserted bits in each bit strings, as an illustrative, non-limiting example.

The query execution module 124 may be configured to use the bitmap index 126 to execute queries regarding measurement data for a media property. For example, the query execution module 124 may receive a query 150 corresponding to the question "What are the top 50 tiles/signals for my audience?" In a particular embodiment, the query 150 may be generated using a query generation interface. If the bitmap index 126 is already sorted by the total number of asserted bits (or includes sort index metadata, as further described with reference to FIG. 10), the query execution module 124 may return data regarding the first fifty strings in the bitmap index 126 (or the fifty strings with the lowest sort index values).

Alternatively, if the bitmap index 126 is not sorted, the query execution module 124 may perform count operations on bit strings stored in the bitmap index 126. In a particular embodiment, because the bit strings may be stored across multiple nodes, the query execution module 124 may formulate a query execution plan that parallelizes execution of the query 150 across multiple nodes and minimizes the amount of data that is transferred between nodes during execution of the query 150. By executing the query 150 on bit strings stored in the bitmap index 126 in parallel without retrieving data from the cloud-based storage 140 and by reducing or minimizing data transfers, the query execution module 124 may achieve real-time or near-real-time performance. For example, the query execution module 124 may have a maximum query execution latency less than or equal to one hundred milliseconds. Further examples regarding query execution are described herein.

During operation, the measurement system 120 may receive the event signals 110 from various event sources. Each event signal may include a unique identifier, such as a user ID. If the user is a "new" audience member, the user may be assigned a new user ID and a user profile may be created for the user. Data for the user profile may be stored in the cloud-based storage 140 and/or the bitmap index 126. In a particular embodiment, data for the user profile may be retrieved from third party data sources, including but not limited to social networks. For example, the data may include, but is not limited to, demographic information associated with the user (e.g., a name, an age, a geographic location, a marital/family status, a homeowner status, etc.), social information associated with the user (e.g., social networking activity of the user, social networking friends/likes/interests of the user, etc.), and other types of data. The cloud-based storage 140 and the bitmap index 126 may be updated as additional event signals 110 are received (e.g., when additional users register with the media property, interact with the media property, etc.).

When the measurement system 120 receives the query 150, the query execution module 124 may execute the query 150 based on a query execution plan that parallelizes execution and reduces/minimizes the amount of bit string data that is transferred between nodes during execution of the query 150. The system 100 of FIG. 1 may thus enable audience measurement and analysis based on data (e.g., event signals) received from various sources. For example, event signals may be generated in response to user interactions with websites, web pages, audio items, video items, games, and/or text associated with various media properties. Further, the system 100 of FIG. 1 may enable real-time or near-real time execution of queries on the collected data. For example, the query execution module 124 may execute complex "top N" queries using the bitmap index 126 in real-time or near-real-time (e.g., within one hundred milliseconds).

In some examples, there may be interest in finding out more about the individual audience members in a segment, rather than merely "what are my top 50 segments." For example, it may be useful to, after identifying the top fifty segments for a property, retrieve a list of e-mail addresses of the users in each of the top fifty segments. As another example, it may be useful to compare the relative popularity of the segments for the property to a larger measurement universe that includes data for multiple properties. To determine such information, one or more additional external data structures and lookup operations may typically be used. For example, the measurement system 120 or the cloud-based storage 140 may include a tiles lookup table 128 and a profiles lookup table 129, which may map metadata items to individual tiles and to individual profile IDs, respectively. Thus, to determine the e-mail addresses for users in a segment, additional lookups to the profiles lookup table 129 based on the profile IDs in the segment may be required. However, having to perform these additional lookup operations may be inefficient.

In accordance with the present disclosure, instead of storing tile and profile metadata in external data structures, such metadata may be stored as a part of the bitmap index 126 as custom internal metadata. Consequently, e-mail addresses for users (instead of or in addition to profile IDs) may be returned as a query result. Thus, including custom internal metadata in the bitmap index 126 may remove the need to access data structures or perform post-query external lookup operations in some cases.

In alternate embodiments, the described bitmap index may correspond to patients and the event signals 110 may identify a patient and may correspond to a healthcare event (e.g., a visit to a doctor's office, a prescription being filled, etc.). Bit strings of the bitmap index 126 may correspond to medical attributes, such as medical history, allergy information, medication taken, etc. The same location in each bit string may correspond to the same patient. As another example, a tracked "audience" may correspond to inventory or customers of a store. Bit strings of the bitmap index 126 may correspond to attributes of inventory, such as color, price, demand, etc., and/or attributes of customers. The same location in each bit string may correspond to the same inventory item or the same customer. As yet another example, in the financial industry, the same location in each bit string may correspond to the same investor, the same financial advisor, the same financial product, etc. As yet another example, bit strings of the bitmap index 126 may correspond to data output by devices in an IoT environment, and the same location of each bit string may correspond to the same device.

Figure 2:
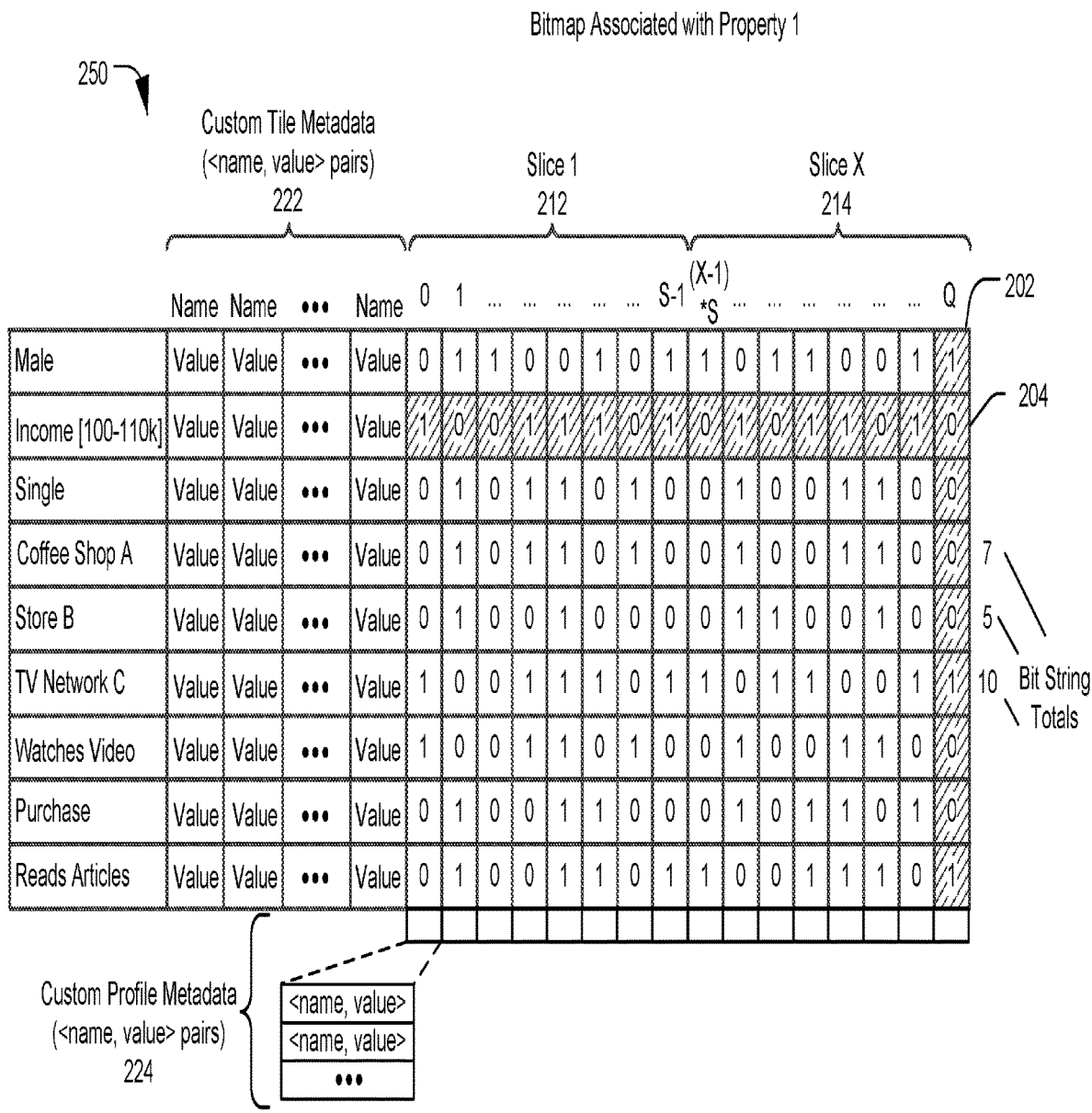
FIG. 2 is a diagram to illustrate a particular embodiment of the bitmap index of FIG. 1.

Referring to FIG. 2, a particular embodiment of a bitmap index 250 is shown. In an illustrative embodiment, the bitmap index 250 is the bitmap index 126 of FIG. 1. The bitmap index 250 may correspond to a particular media property tracked by the measurement system 120 of FIG. 1. The bitmap index 250 stores a plurality of bit strings, which correspond to rows, or portions thereof, in the bitmap index 250. Each bit string represents a "tile," which in the example of FIG. 2 correspond to demographic signals, brand affinity signals, and/or behavior signals exhibited by the audience members. For purposes of illustration, the bitmap index 250 is shown as a grid, where each row 204 of the bitmap index 250 corresponds to a bit string. In FIG. 2, a bit string count is shown for the brand affinity bit strings. For example, the bit string for "Coffee Shop A" has a total of 7, indicating that 7 audience members have a brand affinity for "Coffee Shop A."

As described with reference to FIG. 1, the same location in each bit string may correspond to the same audience member (e.g., "profile" or user ID). Thus, each column 202 of the bitmap index 250 corresponds to a particular audience member. For example, a zero (0) at the intersection of the row 204 and the column 202 indicates that the user having a user ID equal to "Q" does not have an income in the range of $100,000-$110,000. It should be noted that the specific tiles shown in FIG. 2 for example only. Bit strings may be stored for more, fewer, and/or different tiles in alternative embodiments.

In a particular embodiment, each bit string in the bitmap index 250 is subdivided into "slices" (e.g., sub-strings). In the illustrated example, each slice includes S bits, where S is a positive integer. Thus, a first slice 212 of each bit string includes data related to audience members having IDs 0 to S−1. A last (e.g., $X^{th}$) slice 214 includes data related to audience members having IDs (X−1)*S to Q. When bit strings are subdivided into slices, different slices of the same bit string may be stored in different locations (e.g., storage nodes). A hashing algorithm, such as consistent hashing, may be used (e.g., during read operations, write operations, query execution, etc.) to identify locations of the slices of a bit string. The value of S, which represents the maximum length of each slice, may be set based on a desired query execution latency. In a particular embodiment, S is equal to 65,535 (e.g., each slice includes $2^{16}$ bits).

The bitmap index 250 may also include custom tile metadata 222 and custom profile metadata 224. In an illustrative example, such metadata 222, 224 is represented as <name, value> ("name-value") pairs, as shown in FIG. 2. As further described herein, when a query is executed on the bitmap index 250, the corresponding query results may include at least a portion of the metadata 222, 224.

Figure 3:
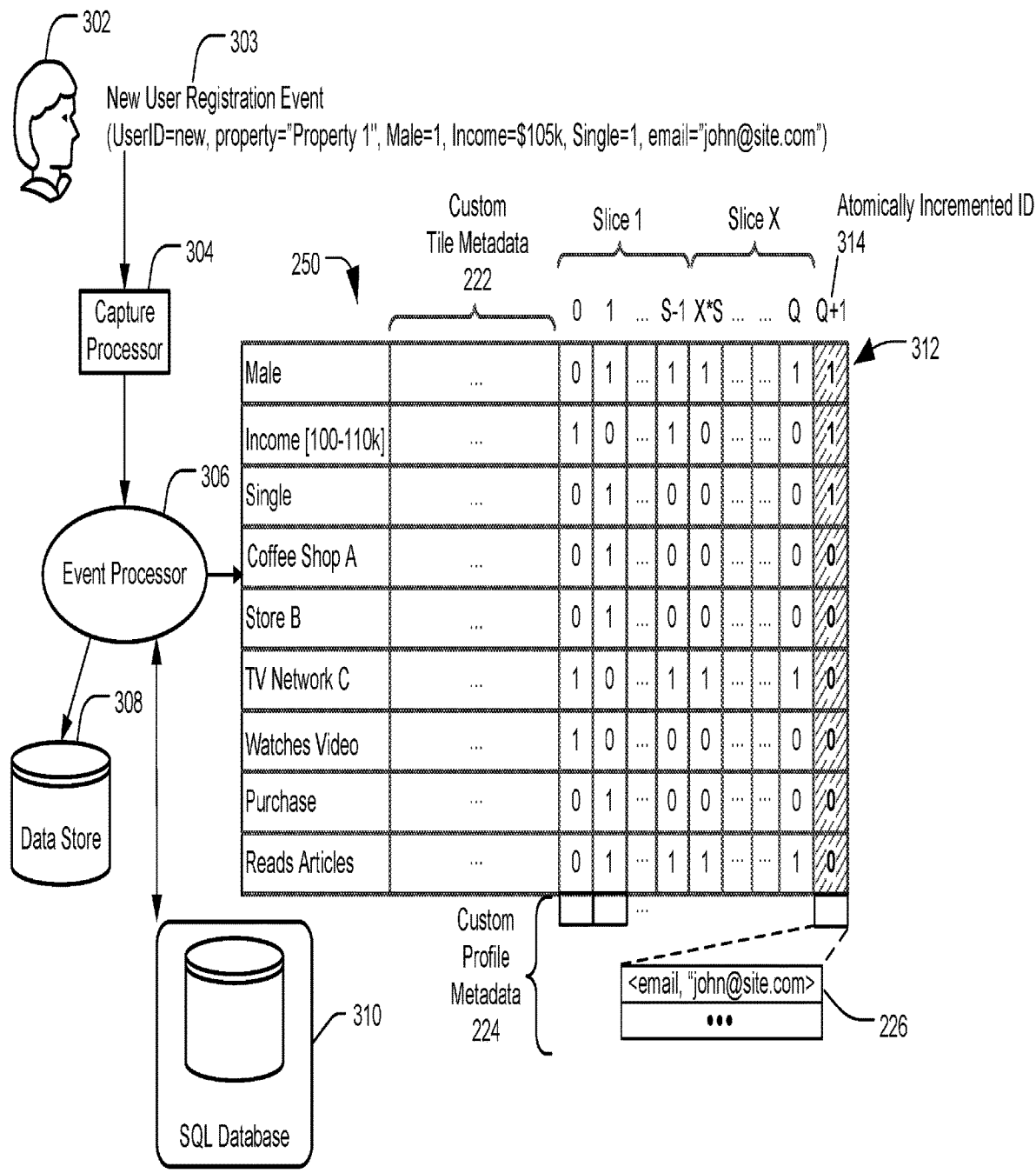
FIG. 3 is a diagram to illustrate a particular embodiment of a method of processing a registration event.

FIG. 3 illustrates an embodiment of adding a new user 302 to the bitmap index 250. In a particular embodiment, adding the new user 302 to the bitmap index 250 may involve a capture processor 304, an event processor 306, a data store 308, and a database (e.g., an illustrative structured query language (SQL) database 310). In an illustrative embodiment, the capture processor 304 and the event processor 306 correspond to the data processing module 122 of FIG. 1. The data store 308 and/or the SQL database 310 may correspond to the cloud-based storage 140 of FIG. 1.

During operation, the capture processor 304 may receive an event signal corresponding to a new user registration event 303 for the user 302. The event signal indicates that the user 302 is to be assigned a new user ID and is a new user for the media property "Property 1." The event signal also indicates (e.g., on the basis of retrieved social networking data and/or third-party data) that the user 302 is a male, has an income of $105,000, is single, and has an e-mail address of "john@site.com." In alternate embodiments, such information may be automatically retrieved by a measurement system after the new user registration event, as further described herein.

The capture processor 304 (which may implement a capture application programming interface (API)) may send the event signal to the event processor 306. Because the user 302 is a new audience member, the event processor 306 may generate and assign a new user ID to the user 302. For example, the event processor 306 may atomically increment a largest previously assigned user ID (e.g., Q) to generate a new user ID 314 (e.g., Q+1). In a particular embodiment, the event processor 306 requests the new user ID 314 from an atomic incrementer service (e.g., a web service). The event processor 306 may then store data corresponding to the event signal in the data store 308, the SQL database 310, and/or the bitmap index 250. For example, a new column 312 may be created in the bitmap index by storing a new $(Q+1)^{th}$ bit in each of the bit strings in the bitmap index. When allocating and storing data in the $(Q+1)^{th}$ column involves creating a new slice, the event processor 306 may automatically generate a new slice for each bit string of the bitmap index 250. The value of the $(Q+1)^{th}$ bit in the "Male," "Income [100-110 k]," and "Single" bit strings may be set to "1" based on the event signal. The value of the $(Q+1)^{th}$ bit in the remaining bit strings may be zero (e.g., a default value). In addition, a new <name, value> pair may be set in the custom profile metadata 224 for e-mail address of the newly added audience member, as shown at 226. In alternative embodiments, contact information other than or in addition to e-mail addresses may be included in the profile metadata 224.

Figure 4:
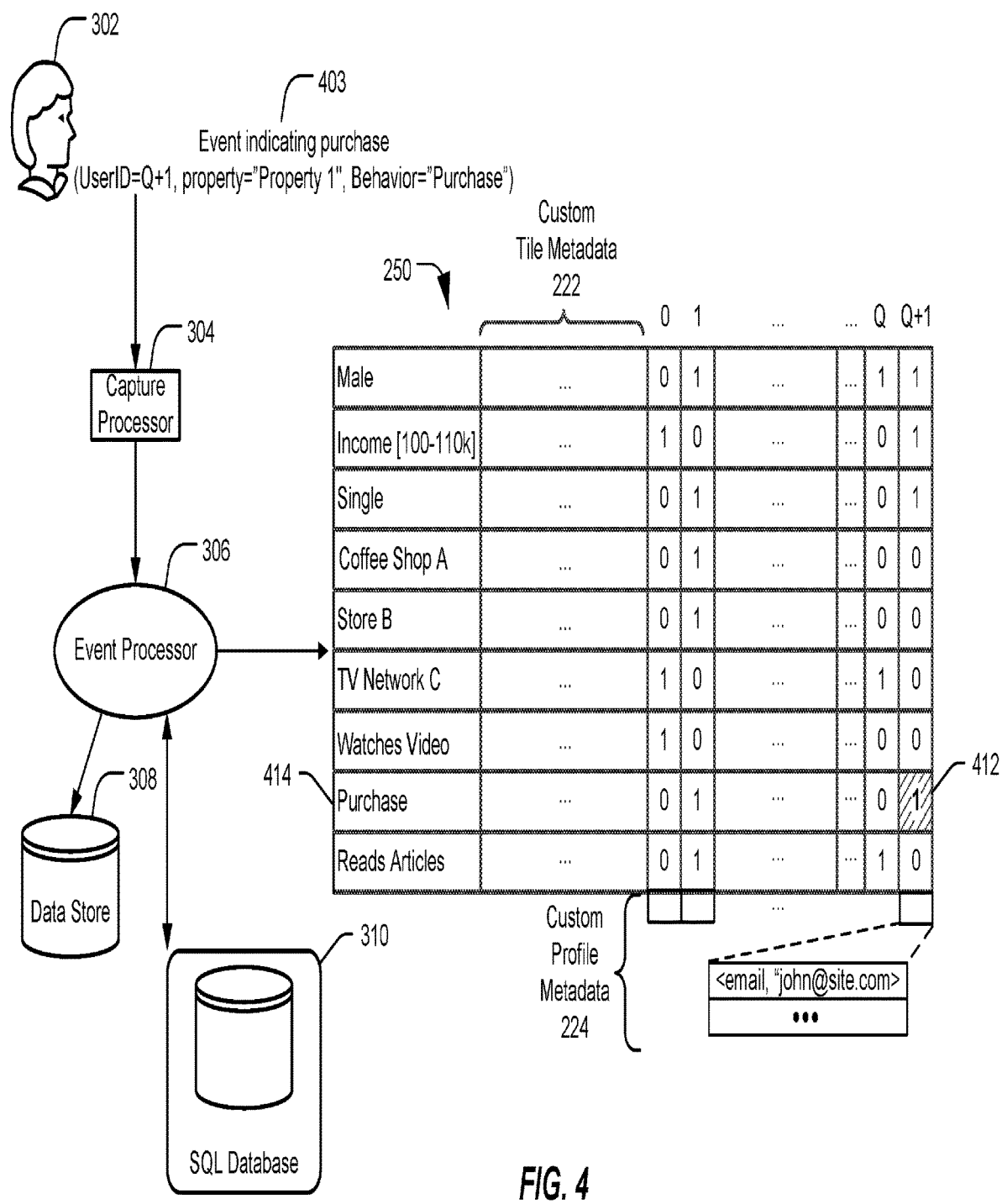
FIG. 4 is a diagram to illustrate a particular embodiment of a method of updating a bitmap index.

FIG. 4 illustrates a particular embodiment of updating the bitmap index 250. During operation, the capture processor 304 may receive an event signal 403 corresponding to updated information for the user 302. In the illustrated example, the event signal 403 is generated based on the user 302 making a purchase on the media property. The event processor 306 may receive the event signal 403 and determine which row(s) and column(s) of the bitmap index 250 are affected by the event signal 403. In the illustrated example, the event processor 306 determines that the event signal 403 will cause the value of the $(Q+1)^{th}$ bit 412 of a "Purchase" bit string 414 to be set to "1." The event processor 306 may also update the data store 308 and/or the SQL database 310 based on the received event signal 403.

Figure 5:
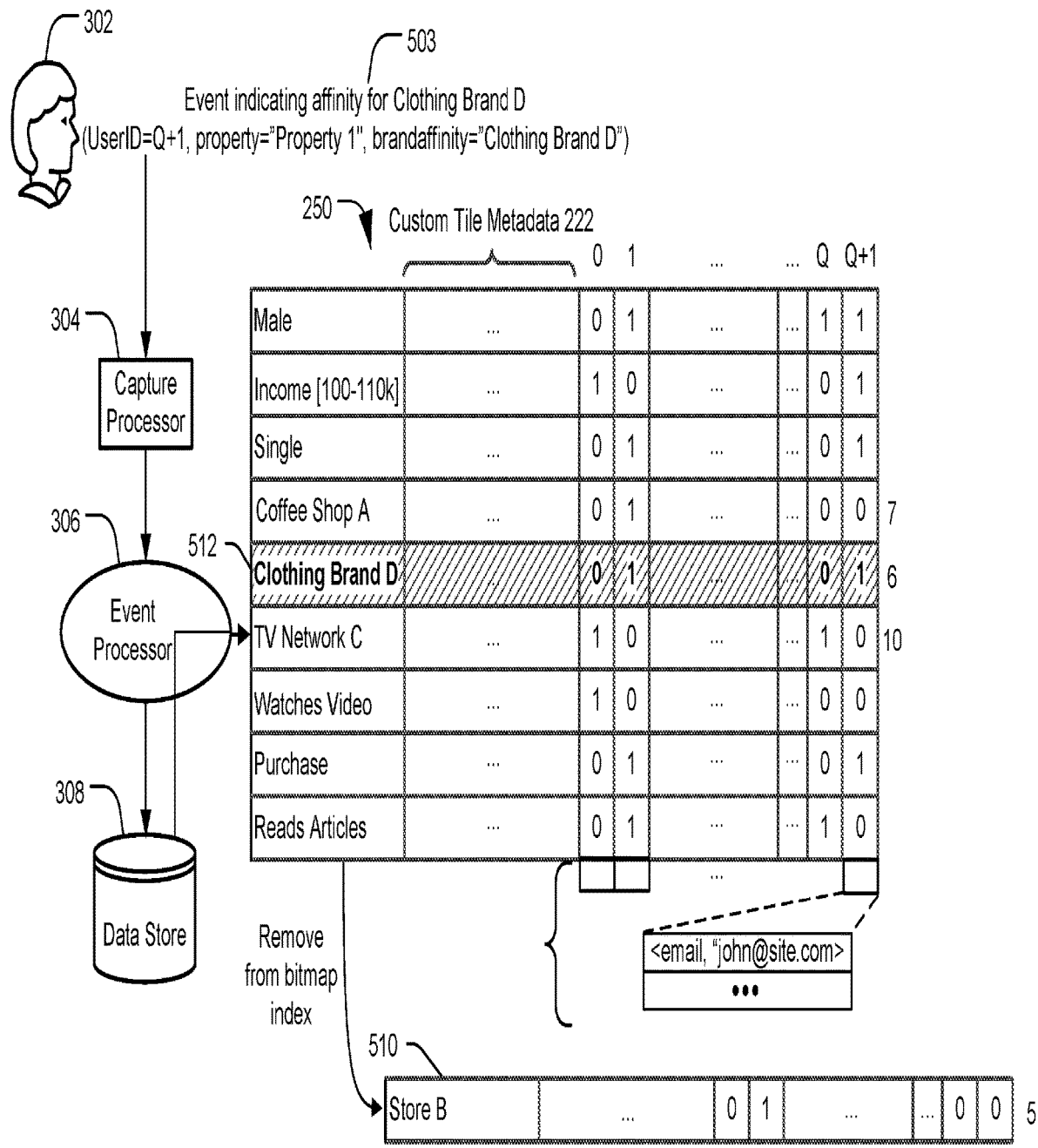
FIG. 5 is a diagram to illustrate another particular embodiment of a method of updating a bitmap index.

As described with reference to FIG. 1, in some embodiments, the bitmap index 250 includes bit strings for fewer than all of the attributes/tiles being tracked. For example, although all demographic and/or behavioral tiles may be stored in the bitmap index 250, bit strings for only the top N brands may be included in the bitmap index 250, where N is an integer greater than or equal to one. In such embodiments, a received event signal may cause a particular tile to become elevated into or fall out of the top N tiles. FIG. 5 illustrates a particular embodiment of updating the bitmap index 250 responsive to an event signal.

For ease of illustration, the bitmap index 250 is depicted as storing three brand affinity bit strings (i.e., N=3). Initially, the three brands may be "Coffee Shop A," "Store B," and "Television Network C." The brand affinity counts for the three brands are 7, 5, and 10 audience members, respectively. Brand affinity data for additional brands (e.g., brands outside the top N brands) may be stored in the data store 308.

A received event signal 503 may indicate that the user 302 has an affinity for "Clothing brand D." Upon receiving the event signal 503, the event processor 306 may determine that a brand affinity bit string for "Clothing Brand D" is not stored in the bitmap index 250. Thus, the event processor 306 may store data for the event signal 403 in the data store 308. The event processor 306 (or a background process or thread) may determine that because of the event signal 503, "Store B" (which has a count of 5) has fallen outside of the top N brands and that "Clothing Brand D" (which now has a count of 6) has become elevated into the top N brands. In response to the determination, a bit string 510 for "Store B" (including any associated tile metadata 222) may be replaced in the bitmap index 250 with a bit string 512 for "Clothing Brand D" (along with any associated tile metadata 222).

Figure 6:
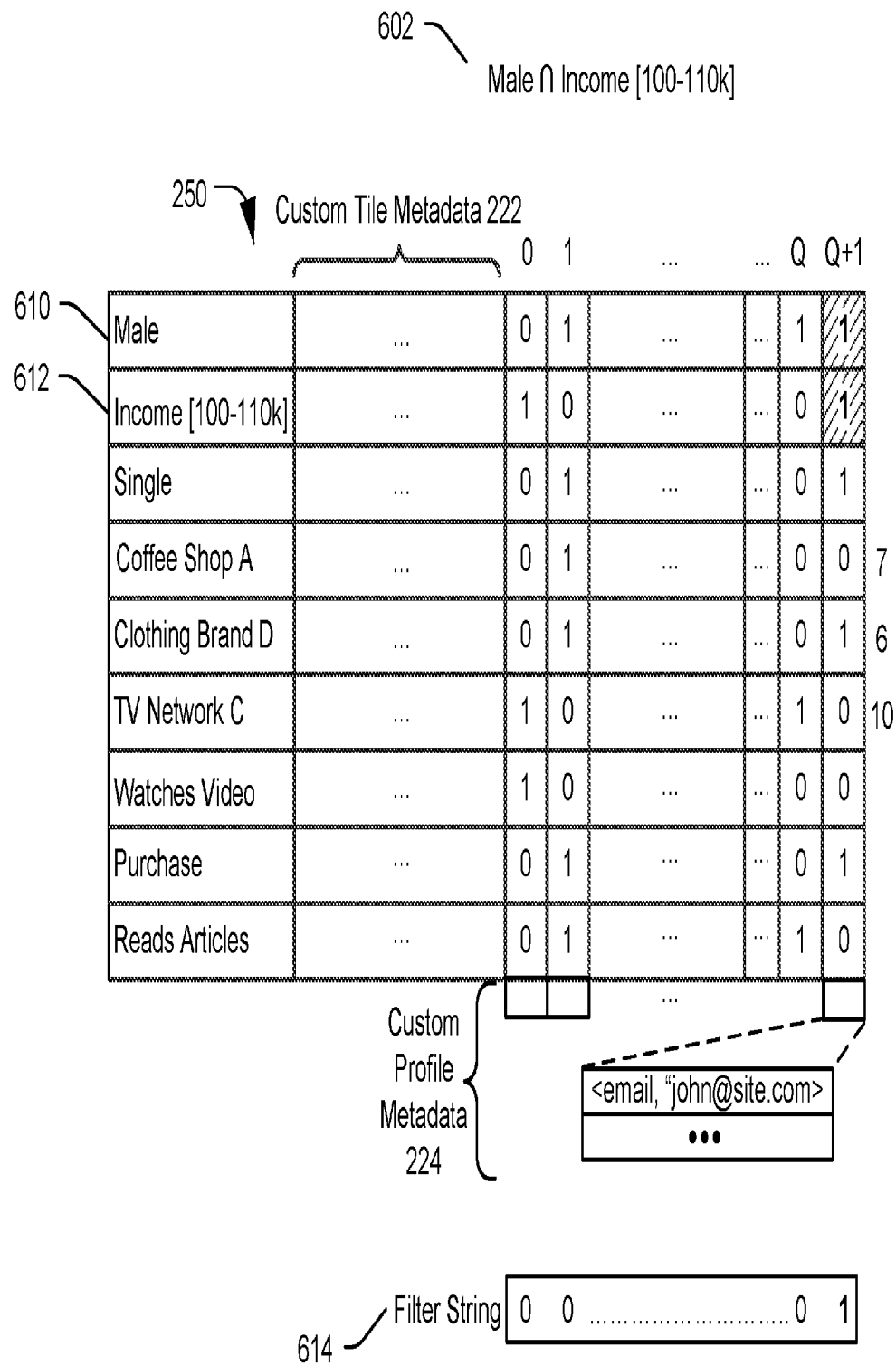
FIG. 6 is a diagram to illustrate a particular embodiment of a method of using a bitmap index during execution of a query.

FIG. 6 illustrates a particular embodiment of executing (e.g., resolving) a query 602 using the bitmap index 250. The query 602 may be received and executed by the query execution module 124 of FIG. 1. The result of executing the query 602 is another bit string 614, referred to herein as a "filter string." In the illustrated example, the query 602 corresponds to an intersection (logical AND) operation between the "Male" and "Income [100-110 k]" demographic properties (i.e., corresponds to the question "Which of my audience members is male and has a household income between $100,000 and $110,000?"). Thus, the filter string 614 may correspond to a custom segment of an audience of a particular property that is associated with the bitmap index 250. The custom audience segment may correspond to an aggregation of audience segments generated using one or more set operations, such as logical AND operations and logical OR operations.

Resolving the query 602 may include ANDing each bit string location (i.e., each user) of a "Male" bit string 610 with a corresponding location of an "Income [$100-110 k]" bit string 612, as shown. When both corresponding locations contain a "1," the corresponding location of the filter string 614 is set to 1. At the conclusion of the AND operations, the filter string 614 corresponds to a custom audience segment of men who earn $100,000-$110,000.

In a particular embodiment, the filter string 614 is stored and available for use during execution of subsequent queries. The filter string 614 may also be used to query the data store 308 (e.g., cloud-based storage) or the SQL database 310 (e.g., a user profile database) regarding the custom audience segment. It should be noted that while the illustrated query 602 calls for a single set operation to generate the filter string 614, the described techniques may be used with more complex queries that involve any number of union operations, intersection operations, and/or count operations. For example, FIG. 7 illustrates a particular embodiment of resolving a (more complex) second query 702 to generate a second filter string 716. In FIG. 7, the query 702 is a top Z brand affinities query (where Z is a positive integer).

The query 702 requests identification of audience members that are male and that like "Coffee Shop A" or have made a purchase on the media property. The filter string 716 may be generated by ORing a "Coffee Shop A" bit string 712 with a "Purchase" bit string 714 to generate an intermediate result string (not shown). The filter string 716 may be generated by ANDing the "Male" bit string 610 with the intermediate result string. The audience members having a "1" in the filter string 716 represent the audience members who are male and either have a brand affinity for "Coffee Shop A" or have made a purchase. In a particular embodiment, the filter string 716 may be stored and used during execution of subsequent queries. For example, to answer the question "What are the top 50 brands for men in my audience that either have an affinity for Coffee Shop A or have made a purchase?" the filter string 716 may be generated. The filter string 716 may be ANDed with each of the brand affinity bit strings to generate result strings. Count operations may be performed on the result strings and the 50 brand affinities with the highest counts may be returned in response to the question.

As another example, to answer the query "What are the e-mail addresses for men in my audience that either have an affinity for Coffee Shop A or have made a purchase," after the filter string 716 is generated, e-mail addresses may be determined, based on the custom profile metadata 224, for each user whose corresponding value in the filter string is "1." To illustrate, because the user having the ID Q+1 has a value of "1" in the filter string 716, the e-mail address "john@site.com" is returned as a result for the query.

It will be appreciated that during query execution, the AND/OR operations performed on bit strings are performed one bit at a time, and the result of an operation on any single bit location does not impact the result of the operation on any other bit location. Thus, query execution may be parallelized. For example, when slices of the bit strings are stored at different network nodes, performing an operation with respect to bit strings may be parallelized into performing the operation with respect to individual slices at individual nodes. To determine where and in what order such parallel operations should be performed, a query execution module may generate a query execution plan.

For example, FIG. 8 illustrates a particular embodiment of generating of a query execution plan 804 to resolve the query 702 of FIG. 7. Upon receiving the query 702, a query execution module 806 may generate a query execution plan 804. In a particular embodiment, because data transfers between nodes may represent a bottleneck, the query execution plan 804 may be generated such that data transfers are reduced/minimized. In a particular embodiment, the query execution module 806 is part of one of the nodes 808-814. Alternately, the query execution module 806 may be part of a separate node (e.g., a load-balancing node).

For example, the query execution module 806 may determine that resolution of the query 702 of FIG. 7 involves performing operations on the "Male" bit string, the "Coffee Shop A" bit string, and the "Purchase" bit string. In the illustrated example, each of the bit strings has three slices. A first slice 816 of the "Male" bit string, designated $Male_1$ is stored on Node A 808. A $Male_2$ slice 818 and a $Male_3$ slice 820 are stored on Node B 810. Coffee Shop $A_1$, Coffee Shop $A_2$, Coffee Shop $A_3$, and $Purchase_3$ slices 822, 824, 826, and 828 are stored on Node C 812. $Purchase_1$ and $Purchase_2$ slices 830 and 832 are stored on Node D 814.

In an illustrative embodiment, each slice corresponds to a data object that includes a bit array, an array of profile IDs corresponding to the bits in the bit array (or alternatively, a starting profile ID and an ending profile ID), a tile ID, a slice ID, an array of <name, value> pairs for tile metadata, and an array of <name, value> pairs for profile metadata. Thus, when the following description refers to copying or moving a slice, the various IDs and metadata stored in conjunction with the slice may also be copied or moved.

The query execution plan 804 identifies operations and at what nodes are to perform the operations. For example, the query execution plan 804 indicates that in a first step, Node C 812 is to perform a union (OR) operation between Coffee Shop $A_3$ slice 826 and the $Purchase_3$ slice 828 to generate an intermediate result slice $Union_3$. In parallel, Node A 808 is to transfer a copy of the $Male_1$ slice 816 to Node C 812 and Node B 810 is to transfer copies of the $Male_2$ slice 818 and the $Male_3$ slice 820 to Node C 812. Node D is to transfer copies of the $Purchase_1$ slice 830 and the $Purchase_2$ slice 832 to Node C 812.

In a second step, Node C 812 performs two operations in parallel: ORing the $Purchase_1$ slice 830 and the Coffee Shop $A_1$ slice 822 to generate an intermediate result slice $Union_1$, and ORing the $Purchase_2$ slice 832 and the Coffee Shop $A_2$ slice 824 to generate an intermediate result slice $Union_2$.

In a third step, Node C 812 performs three operations in parallel to generate three intermediate bit strings. The first intermediate bit string $Result_1$ is generated by ANDing the $Union_1$ slice with the $Male_1$ slice. The second intermediate bit string Result is generated by ANDing the $Union_2$ slice with the $Male_2$ slice. The third intermediate bit string $Result_3$ is generated by ANDing the $Union_3$ slice with the $Male_3$ slice. In a fourth step, Node C concatenates the $Result_1$, $Result_2$, and $Result_3$ bit strings to generate the filter string 716 of FIG. 7.

FIG. 8 thus illustrates generation of a query execution plan for a query. In a particular embodiment, the query execution plan is generated prior to performing any set operations. The query execution plan may be generated so as to increase the number of parallel operations and reduce the number of bit string (or slice) transfers between nodes, which may result in improved query execution latency.

Figure 9:
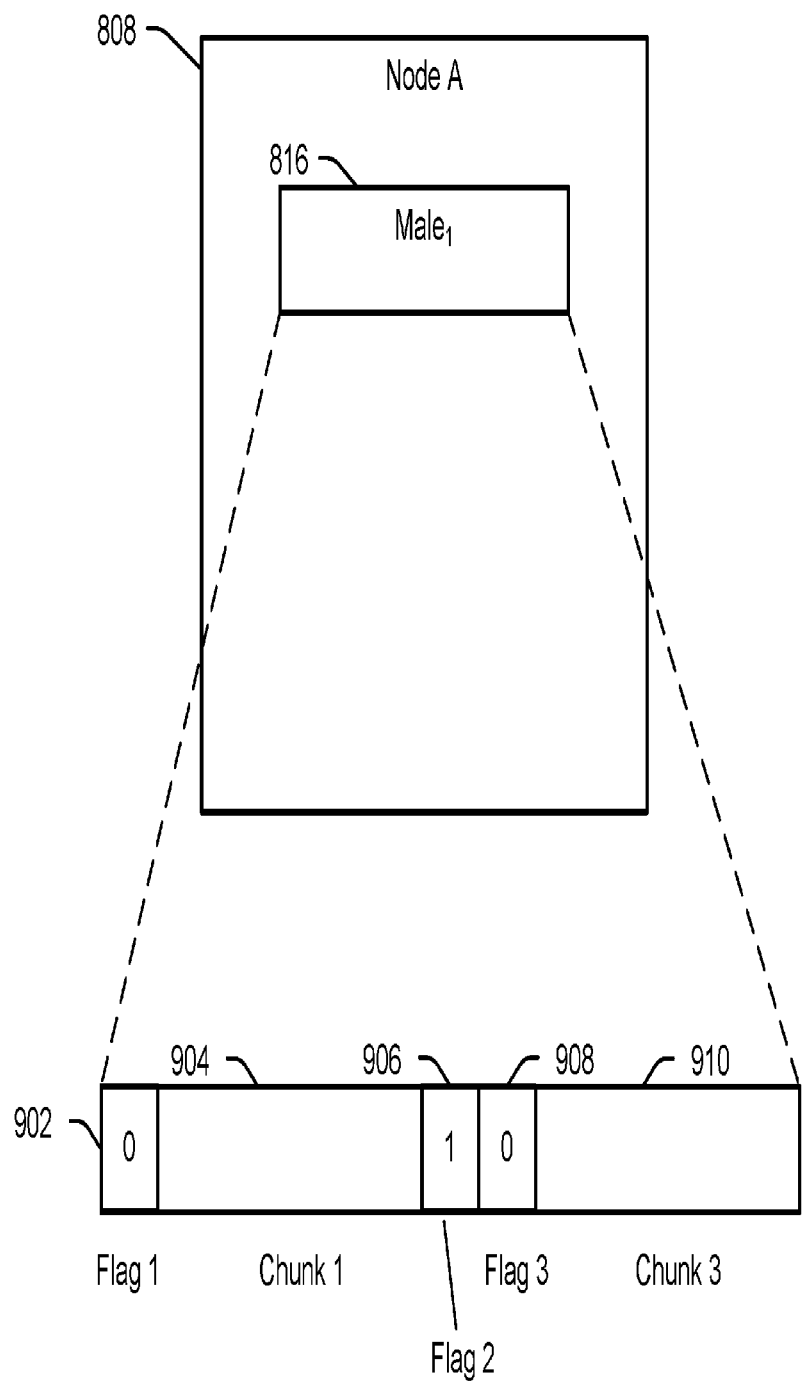
FIG. 9 is a diagram to illustrate a particular embodiment of a method of compressing and storing a bit string of a bitmap index.

In the foregoing description, bit strings are described as being subdivided into slices. For example, each slice may include 64 kibibits (1 kibibit=$2^{10}$ bits=1,024 bits). In a particular embodiment, slices may be further divided into "chunks." For example, chunks may be up to 2 kibibits in length (e.g., each slice is subdivided into 32 chunks). To reduce the amount of space occupied by bit strings of a bitmap index, chunks may be stored in a compressed fashion. For example, FIG. 9 illustrates a particular embodiment of compressing and storing data of a bitmap index. In particular, FIG. 9 depicts Node A 808 of FIG. 8, which stores the $Male_1$ slice 816. The (bit array of) $Male_1$ slice 816 may be compressed in accordance with various compression schemes. In the illustrated compression scheme, chunks that have only zeroes are not stored. Chunks that include a one are stored. A flag corresponding to each chunk is stored. If a flag has a value of zero, the corresponding chunk is stored in its entirety. For example, a first flag 902 and a third flag 908 have a value of zero, indicating that corresponding first chunk 904 and third chunk 910 are stored at Node A 808. If a flag has a value of one, the corresponding chunk is "compressed" by not being stored. For example, a second flag 906 has a value of one, indicating that a corresponding second chunk includes only zeroes and is not stored. During queries, the second chunk may be dynamically generated by introducing zeroes (e.g., 2,048 zeroes) between the first chunk 904 and the third chunk 910.

While FIG. 9 illustrates one example of a compression scheme, in alternate embodiments, different compression schemes may be used. Further, data for the compression scheme may be stored in different places. For example, the chunks 904 and 910 may be stored at Node A 808, and the flags 902, 906, and 908 may be stored in a different location (e.g., as part of a hash table that is used to identify where slices/chunks of a bit string are stored).

Figure 10:
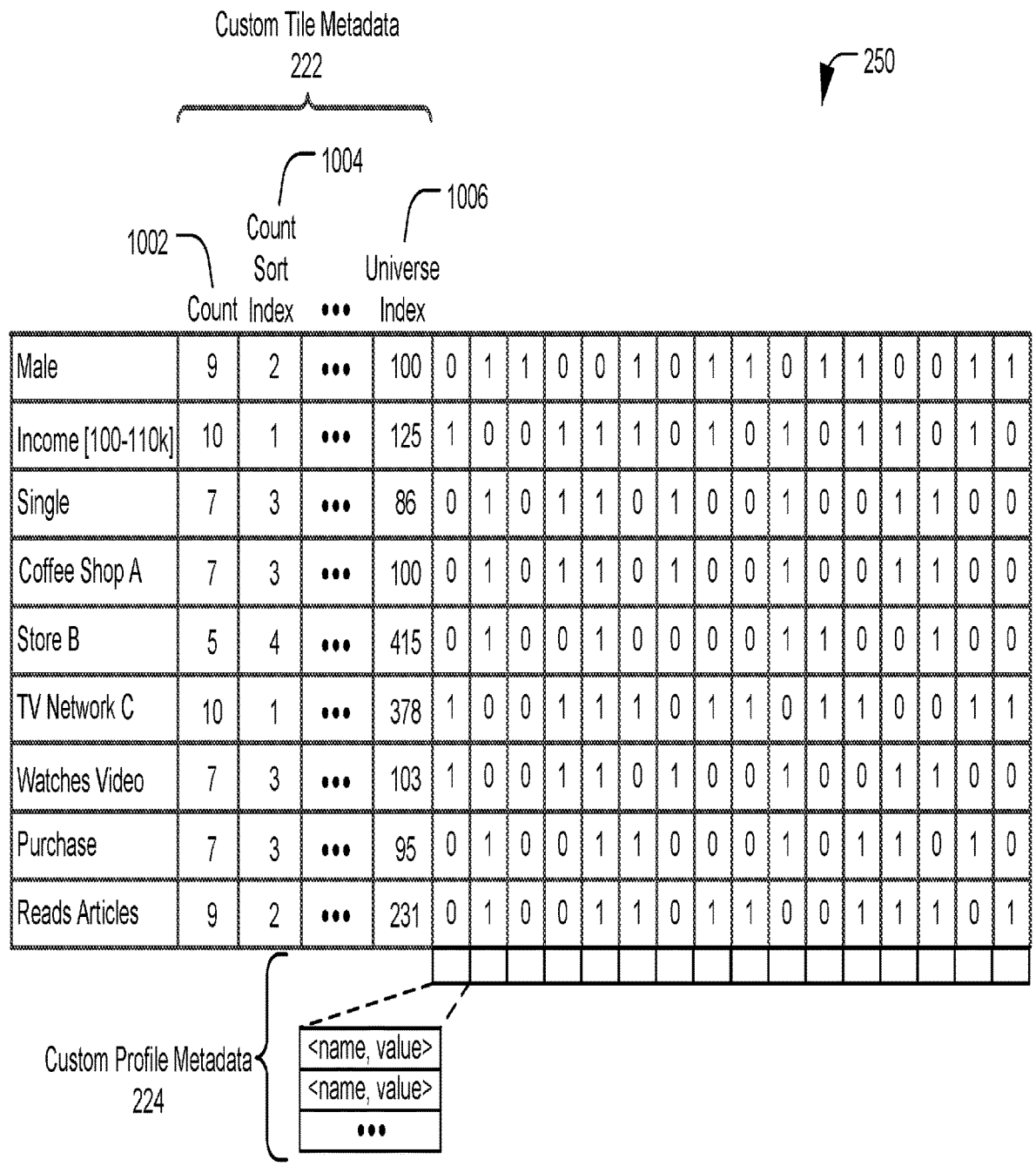
FIG. 10 is a diagram to illustrate another particular embodiment of the bitmap index of FIG. 1.

FIG. 10 illustrates an example of storing multiple sortable metadata items in the bitmap index 250. In particular, the custom tile metadata 222 includes a count 1002, a count sort index 1004, and a universe index 1006 for each bit string. Thus, in a particular embodiment, if slices of a bit string are stored in distributed fashion, then data regarding the count 1002, the count sort index 1004, and the universe index 1006 may be stored along with each slice.

In accordance with the present disclosure, multiple sortable metadata items may be included in the bitmap index 250. In the example of FIG. 10, the count 1002 corresponds to the count of "1" values in each bit string. In some examples, the count 1002 for an individual slice may be the count of "1" values in the slice rather than the bit string as a whole. Alternatively, the total count 1002 may be stored along with each slice. The count sort index 1004 may enable the bitmap index 250 to be quickly sorted by the count 1002. When the bitmap index 250 is sorted by the count 1002, the bit strings for "Income 100-110 k" and "TV Network C" will rise to the top; therefore those bit strings have count sort indexes of 1. Adding sort indexes to the bitmap index 250 may enable the bitmap index to function as a cache that is concurrently sorted by multiple individual, custom sorting parameters (e.g., count, universal index, etc.). As data in the bitmap index changes, the sort indexes can be updated without having to relocate bit strings higher or lower within the bitmap index.

In an illustrative embodiment, the universe index 1006 is based on a comparison of a popularity of a tile with respect to a media property (e.g., website) and a popularity of the tile with respect to a larger measurement universe that includes multiple media properties (e.g., websites). To illustrate, a measurement system, such as the measurement system 120 of FIG. 1, may collect data regarding audiences of a large number of media properties. If a media property owner opts-in to aggregate data metrics, then the universe index 1006 may be generated in the bitmap index for the media property. In the example of FIG. 10, a universe index of 100 indicates that the corresponding tile is equally popular in the measurement universe as it is for the individual media property. If the tile is less popular for the media property than for the measurement universe, the universe index has a value of less than 100. If the tile is more popular for the media property than for the measurement universe, the universe index has a value of more than 100. In the illustrated example, "Store B" has a relatively low count of 5 but a large universe index of 415, indicating that the media property has a much larger proportion of "Store B" fans than the measurement universe as a whole. Based on this information, the owner of the media property may tailor content and/or marketing campaigns with information related to "Store B," in the hopes of turning their media property into a "go-to" Internet location for information about "Store B."

Although not shown in FIG. 10, it is to be understood that various other types of tile and/or profile metadata may be stored in the bitmap index 250. For example, the bitmap index 250 includes a category for bit strings. To illustrate, each of multiple brands of beer, wine, and sprits may have "alcoholic beverages" listed as a category. The category metadata may enable determining a custom composite segment that includes each of the beer, wine, and sprit brands. For example, although individual brands may have low counts, the custom segment for alcoholic beverages may have a large enough count to warrant marketing attention. Such category metadata may also enable querying the bitmap index 250 using "alcoholic beverage" rather than having to OR together individual beer, wine, and spirit brands.

Figure 11:
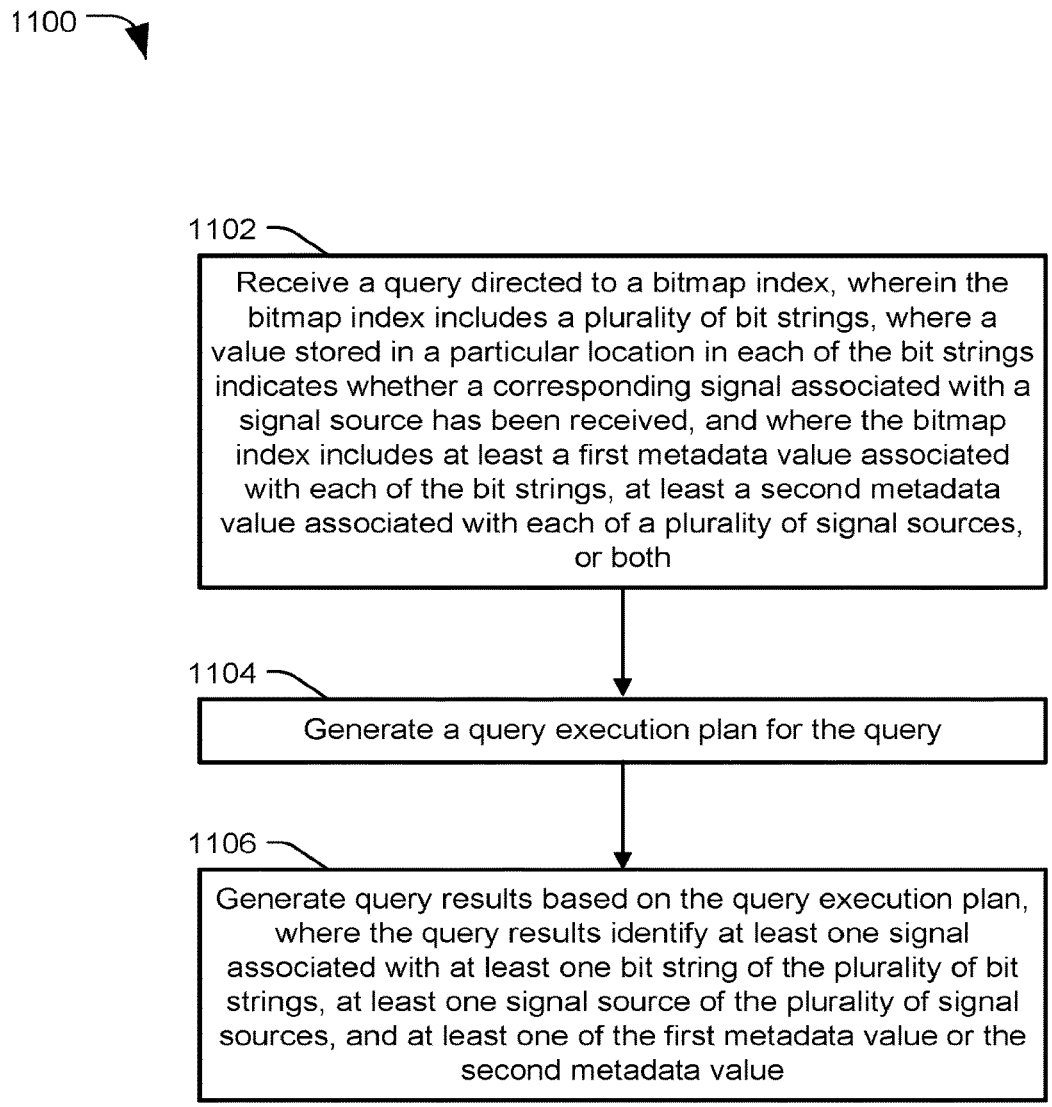
FIG. 11 is a flowchart to illustrate a particular embodiment of a method of using a bitmap index having internal metadata storage.

Referring to FIG. 11, a particular embodiment of a method 1100 of using a bitmap index is shown. In an illustrative embodiment, the method 1100 may be performed by a computing device having a processor, such as a computing device included in the measurement system 120 of FIG. 1.

The method 1100 includes receiving a query directed to a bitmap index, at 1102. The bitmap index includes a plurality of bit strings, where a value stored in a particular location in each of the bit strings indicates whether a corresponding signal associated with a signal source has been received. As illustrative non-limiting examples, a signal source may include a user, a computing device associated with the user, or a computing device not associated with any user (e.g., an IoT device). The bitmap index includes at least a first metadata value associated with each of the bit strings, at least a second metadata value associated with each of a plurality of signal sources, or both. The method also includes generating a query execution plan for the query, at 1104, and generating query results based on the query execution plan, at 1106. The query results identify at least one signal associated with at least one bit string of the plurality of bit strings, at least one signal source of the plurality of signal sources, and at least one of the first metadata value or the second metadata value.

Figure 12:
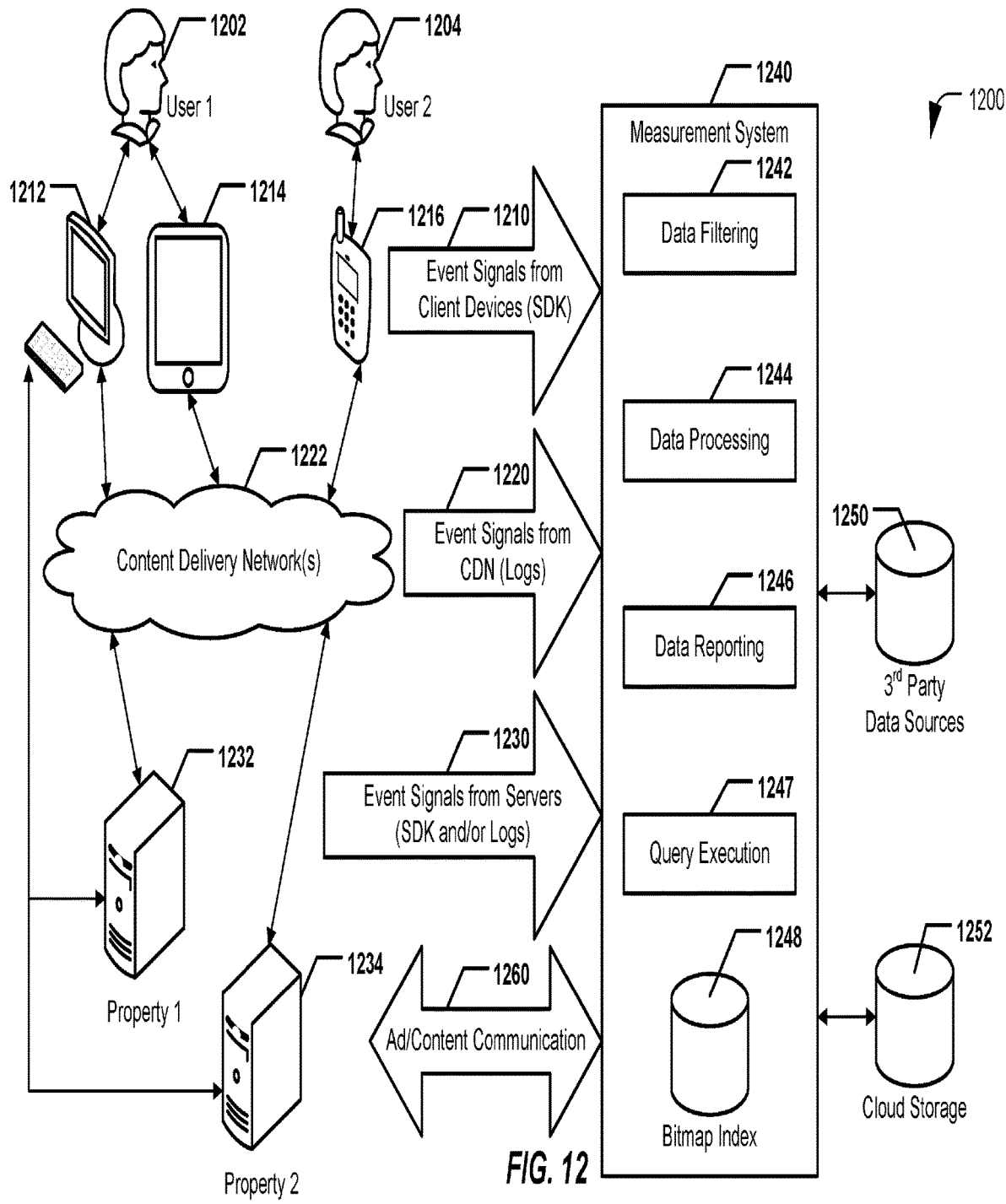
FIG. 12 is a diagram to illustrate a particular embodiment of an audience measurement system that is operable to generate and use a bitmap index.

The bitmap index described herein may thus enable a measurement system, such as the measurement system 120, to quickly provide analysis for "raw" data stored in an offsite (e.g., cloud-based) storage location. The bitmap index may represent an on-the-fly index of binary representations of different audience traits that can be mined to determine what set of audience members is most likely to be receptive to particular content, a particular advertisement, etc. Audience traits may be combined into long bit strings, where each bit string represents a single trait for an entire audience. By keeping the bitmap index "hot" in memory, ad-hoc queries may be performed efficiently and with reduced latency, and the results of such queries can include metadata regarding the audience traits and/or audience members. The described techniques may also be used with other types of systems. For example, in alternate embodiments, the same location in each bit string of the bitmap index may correspond to an identifier other than a user ID, such as an inventory number, an employee number, a hospital patient identifier, etc. FIGS. 12 and 13 illustrate additional scenarios in which a bitmap index may be generated and used.

In particular, FIG. 12 illustrates an alternate embodiment of a measurement system and is generally designated 1200. A measurement system 1240 may be communicatively coupled to one or more user devices (e.g., illustrative user devices 1212, 1214, and 1216), to one or more content delivery networks (CDNs) (e.g., illustrative CDN 1222), and to properties (e.g., websites) 1232 and 1234. In FIG. 12, the properties 1232 and 1234 are illustrated by corresponding servers (e.g., web servers). The measurement system 1240 may be implemented using one or more computing devices (e.g., servers). For example, such computing devices may include one or more processors or processing logic, memories, and network interfaces. The memories may include instructions executable by the processors to perform various functions described herein. The network interfaces may include wired and/or wireless interfaces operable to enable communication to local area networks and/or wide area networks (e.g., the Internet).

The user devices 1212-1216 may be associated with various users. For example, the desktop computing device 1212 and the tablet computing device 1214 may be associated with a first user 1202, and the mobile telephone device (e.g., smartphone) 1216 may be associated with a second user 1204. It should be noted that the user devices 1212-1216 are shown for example only and are not to be considered limiting. In alternate embodiments, fewer, additional, and/or different types of user devices may be present in the system 1200. For example, a radio-frequency identification (RFID)-enabled device may be carried by a user and may transmit a signal in response to detecting that the user is visiting a particular physical location. In a particular embodiment, the user devices 1212-1216 may execute applications that are operable to access the properties 1232 and 1234. For example, the user devices 1212-1216 may include applications developed using a mobile software development kit (SDK) that includes support for audience measurement functions. To illustrate, when the SDK-based applications interact with the properties 1232 and 1234, the applications may generate first event signals 1210 that are transmitted by the user devices 1212-1216 to the measurement system 1240.

The first event signals 1210 may include information identifying specific interactions by the users 1202-1204 via the user devices 1212-1216 (e.g., what action was taken at a media property, when the action was taken, for how long the action was taken, etc.). The user interactions may include interactions with advertisements presented by the media property and/or interactions with content presented by the media property. The event signals 1210 may also include an identifier, such as a browser identifier (browser ID) generated by the SDK. In a particular embodiment, browser identifiers are unique across software installations and devices. For example, a first installation of a SDK-based application at the desktop computing device 1212 and a second installation of the same SDK-based application at the tablet computing device 1214 may use different browser IDs, even though both installations are associated with the same user 1202.

In another particular embodiment, Browser IDs may remain consistent until applications or web browsers are "reset" (e.g., caches/cookies are cleared). In some embodiments, the user devices 1212-1216 may execute applications other than browser applications, such as downloadable mobile applications, that generate the event signals 1210 based on user interactions with advertisements and/or content presented by the applications.

The user devices 1212-1216 may access content provided by the properties 1232 and 1234 directly or via the CDN 1222. The CDN 1222 may provide distributed, load-balanced access to audio, video, graphics, and web pages associated with the media properties 1232 and 1234. For example, the CDN 1222 may include geographically distributed web servers and media servers that serve Internet content in a load-balanced fashion. The CDN 1222 may send second event signals 1220 to the measurement system 1240. The second event signals 1220 may include information identifying interactions with media properties and browser IDs provided to the CDN 1222 by the user devices 1212-1216 and/or the properties 1232 and 1234. For example, the second event signals 1220 may include CDN logs or data from CDN logs.

The media properties 1232 and 1234 may be controlled by the same entity (e.g., may be part of a federated property) or by different entities. The properties 1232 and 1234 may send third event signals 1230 to the measurement system 1240. The third event signals 1230 may include information identifying interactions with the media properties and browser IDs provided by the user devices 1212-1216 during communication with the properties 1232 and 1234 (e.g., communication via hypertext transfer protocol (HTTP), transport control protocol/internet protocol (TCP/IP), or other network protocols).

In a particular embodiment, the third event signals 1230 may include server logs or data from server logs. Alternately, or in addition, the third event signals 1230 may be generated by SDK-based (e.g., web SDK-based) applications executing at the properties 1232 and 1234, such as scripts embedded into web pages hosted by the properties 1232 and 1234.

The first event signals 1210 from the user devices 1212-1216 and the second event signals 1220 generated by the CDN 1222 may be considered "first-party" event signals. The third event signals 1230 from the properties 1232 and 1234 may be considered "third-party" event signals. First party event signals may be considered more trustworthy and reliable than third party event signals, because of the possibility that third party event signals could be modified by a media property owner prior to transmission to the measurement system 1240.

In a particular embodiment, the properties 1232 and 1234 may send data to the measurement system 1240 and receive data from the measurement system 1240 regarding advertisements and/or content presented by the properties 1232 and 1234. Such communication is illustrated in FIG. 12 as advertisement/content communication 1260. For example, an advertisement (or software associated with the advertisement that is executing on a client device, such as web server, a computer, a mobile phone, a tablet device, etc.) may collect and transmit data on a per-advertisement, per-user basis. The data may include or identify a profile of a user, a duration that the user viewed the advertisement, action(s) performed by the user with respect to the advertisement, etc. As another example, a content item or software associated therewith may collect and transmit data regarding user interactions with the content item.

In a particular embodiment, the measurement system 1240 includes a data filtering module 1242, a data processing module 1244, a data reporting module 1246, and a query execution module 1247. In a particular embodiment, each of the modules 1242-1247 is implemented using instructions executable by one or more processors at the measurement system 1240.

The data filtering module 1242 may receive the event signals 1210, 1220, and 1230. The data filtering module 1242 may check the event signals 1210, 1220, and 1230 for errors and may perform data cleanup operations when errors are found. The data filtering module 1242 may also receive and perform cleanup operations on advertisement measurement data and content measurement data received from the properties 1232 and 1234 and from applications executing on the user devices 1212-1216. In a particular embodiment, the data filtering module 1242 may implement various application programming interfaces (APIs) for event signal collection and inspection. The data filtering module 1242 may store authenticated/verified event signals in a database, event cache, archive, and/or cloud storage 1252. In a particular embodiment, the measurement system 1240 includes or has access to a brand database that tracks brands. For example, "raw" data corresponding to the brand database and other collected data may be stored in the cloud storage 1252. Signals received from the properties 1232 and 1234 and from applications executing the user devices 1212-1216 may identify a brand that matches one of the brands in the brand database. The measurement system 1240 may thus track advertisements/content for various brands across multiple properties.

The data processing module 1244 may operate as described with reference to the data processing module 122 of FIG. 1. Alternately, or in addition, the data processing module 1244 may associate received event signals (and interactions represented thereby) with user profiles of users. For example, when an event signal having a particular browser ID is a social networking registration event (e.g., when a user logs into a website using a Facebook® account, a Twitter® account, a LinkedIn® account, or some other social networking account), the data processing module 1244 may retrieve a corresponding social networking profile or other user profile data from third party data sources 1250. Facebook is a registered trademark of Facebook, Inc. of Menlo Park, Calif. Twitter is a registered trademark of Twitter, Inc. of San Francisco, Calif. LinkedIn is a registered trademark of LinkedIn Corp. of Mountain View, Calif.

It will be appreciated that interactions that were previously associated only with the particular browser ID (i.e., "impersonal" alphanumeric data) may be associated with an actual person (e.g., John Smith) after retrieval of the social networking profile or user profile. Associating interactions with individuals may enable qualitative analysis of the audiences of media properties. For example, if John Smith is a fan of a particular sports team, the measurement system 1240 may indicate that at least one member of the audience of the first property 1232 or the second property 1234 is a fan of the particular sports team. When a large percentage of a media property's audience shares a particular characteristic or interest, the media property may use such information in selecting and/or generating advertising or content. User profiles (e.g., a profile of the user John Smith) and audience profiles (e.g., profiles for the media properties associated with the properties 1232 and 1234) may be stored in the cloud storage 1252 and/or in another database. An audience profile for a particular media property may be generated by aggregating the user profiles of the individual users (e.g., including John Smith) that interacted with the particular media property.

Audience profiles may be generated using as few as one or two user profiles, although any number of user profiles may be aggregated. In a particular embodiment, audience profiles may be updated periodically (e.g., nightly, weekly, monthly, etc.), in response to receiving updated data for one or more users in the audience, in response to receiving a request for audience profile data, or any combination thereof. Audience profiles may similarly be generated for audiences of a particular mobile application based on signals generated by installations of the mobile application on various user devices.

The data reporting module 1246 may generate various interfaces. The data reporting module 1246 may also support an application programming interface (API) that enables external devices to view and analyze data collected and stored by the measurement system 1240. In a particular embodiment, the data reporting module 1246 is configured to segment the data.

As used herein, a "segment" is based on a group of people (e.g., an audience or a subset thereof). As further described herein, a digital genome may be determined for each segment. Examples of segments include, but are not limited to, brand affinity segments (also called brand segments), demographic segments, geographic segments, social activity segments, employer segments, educational institution segments, professional group segments, industry category of employer segments, brand affinity category segments, professional skills segments, job title segments, and behavioral segments. In a particular embodiment, behavioral segments are defined by a client (e.g., property owner or publisher) or by the measurement system 1240, and represent actions taken on a client's property.

Additional examples of segments include segments based on an advertisement, an advertisement campaign, an advertisement placement, an advertisement context, a content item, a content context, content placement, a platform (e.g., desktop/laptop computer vs. mobile phone vs. tablet computer), etc. Segments may be used to understand or evaluate characteristics of an audience, craft a content strategy, generate advertising leads, create advertising pitches, and respond to inbound advertising requests. Segments may also be used to acquire additional audience members, receive information from advertisements/content items, and send information to advertisements/content items. In a particular embodiment, the measurement system 1240 may be operable to define "new" segments based on performing logical operations (e.g., logical OR operations and logical AND operations).

The measurement system 1240 may also include a bitmap index 1248 (e.g., the bitmap index 126 of FIG. 1 and/or the bitmap index 250 of FIG. 2). The bitmap index 1248 may store bit strings corresponding to at least a subset of the "raw" data stored in the cloud storage 1252. In one example, a different bitmap index 1248 is maintained for each property 1232, 1234. The bitmap index 1248 for a particular property may include, for each audience member of the property, data regarding a demographic attribute of the audience member, a brand affinity of the audience member, and/or behaviors (e.g., interactions with the media property) of the audience member. The same location in each bit string of the bitmap index 1248 may correspond to the same user.

The data processing module 1244 may also be configured to, upon receiving an event signal, parse the event signal to identify what user and media property the event signal corresponds to. The data processing module 1244 may store data corresponding to the event signal in one or more databases (e.g., the cloud storage 1252, a user profile database, etc.). The data processing module 1244 may also store indexing data corresponding to the event signal in the bitmap index 1248 for the identified media property. If the user is a new audience member for the media property, the data processing module 1244 may assign a new ID to the user. Event signals may be processed as described above with reference to FIGS. 1-9.

The query execution module 1247 may operate as described with reference to the query execution module 124 of FIG. 1 and/or the query execution module 806 of FIG. 8. For example, the query execution module 1247 may receive a query and generate a query execution plan that parallelizes execution and reduces/minimizes data transfers between storage nodes during query execution.

During operation, the users 1202-1204 may interact with the media properties 1232 and 1234 and with applications executing on the user devices 1212-1216. In response to the interactions, the measurement system 1240 may receive the event signals 1210, 1220, 1230, and/or 1260. Each event signal may include a unique identifier, such as a browser ID and/or an audience member ID. If the user is a "new" audience member, the data processing module 1244 may create a user profile. Data for the user profile may be stored in the cloud storage 1252 and/or the bitmap index 1248. In a particular embodiment, data for the user profile may be retrieved from the third party data sources 1250.

For example, the data processing module 1244 may retrieve and store data from one or more social network profiles of the user. The data may include demographic information associated with the user (e.g., a name, an age, a geographic location, a marital/family status, a homeowner status, etc.), social information associated with the user (e.g., social networking activity of the user, social networking friends/likes/interests of the user, etc.), and other types of data. The data processing module 1244 may also collect and store data associated with advertisements and content served by the properties 1232 and 1234 and by applications executing on the user devices 1212-1216. In a particular embodiment, the measurement system 1240 is further configured to receive offline data from external data sources. For example, the measurement system 1240 may receive data regarding transactions (e.g., purchases) made by an audience and may use the transaction data to generate additional signals that contribute to the digital genome of an audience, brand, property, etc. Another example of offline data may be a "data dump" of data collected by an RFID-enabled device or an RFID detector. Offline data may be stored in one or more computer-readable files that are provided to the measurement system 1240. In a particular embodiment, offline data can include previously collected data regarding users or audience members (e.g., names, addresses, etc.).

The data reporting module 1246 may report data collected by the measurement system 1240. For example, the data reporting module 1246 may generate reports based on an audience profile of a media property (or application), where the audience profile is based on aggregating user profiles of users that interacted with the media property (or application). To illustrate, the data reporting module 1246 may generate an interface indicating demographic attributes of the audience as a whole (e.g., a percentage of audience members that are male or female, percentages of audience members in various age brackets, percentages of audience members in various income bracket, most common audience member cities/states of residence, etc.). The interface may also indicate social attributes of the audience as a whole (e.g., the most popular movies, sports teams, etc. amongst members of the audience). Audience profiles may also be segmented and/or aggregated with other audience profiles, as further described herein. Audience profiles may further be segmented based on advertisement, advertisement campaign, brand, content item, etc. Audience profiles may also be constructed by combining segments, as further described herein.

In a particular embodiment, the system 1200 may also receive event signals based on measurements (e.g., hardware measurements) made at a device. For example, an event signal from the tablet computing device 1214 or the mobile telephone device 1216 may include data associated with a hardware measurement at the tablet computing device 1214 or the mobile telephone device 1216, such as an accelerometer or gyroscope measurement indicating an orientation, a tilt, a movement direction, and/or a movement velocity of the tablet computing device 1214 or the mobile telephone device 1216. As another example, the system 1200 may receive a signal in response to an RFID device detecting that a user is visiting a particular physical location. The system 1200 of FIG. 12 may also link interactions with user profiles of users. This may provide information of "how many" viewers and "how long" the viewers watched a particular video (e.g., as in direct response measurement systems), and also "who" watched the particular video (e.g., demographic, social, and behavioral attributes of the viewers).

The system 1200 of FIG. 12 may thus enable audience measurement and analysis based on data (e.g., event signals) received from various sources. Further, the system 1200 of FIG. 12 may enable real-time or near-real time execution of queries on collected data, such as execution of "top N" queries using the bitmap index 1248.

Figure 13A:
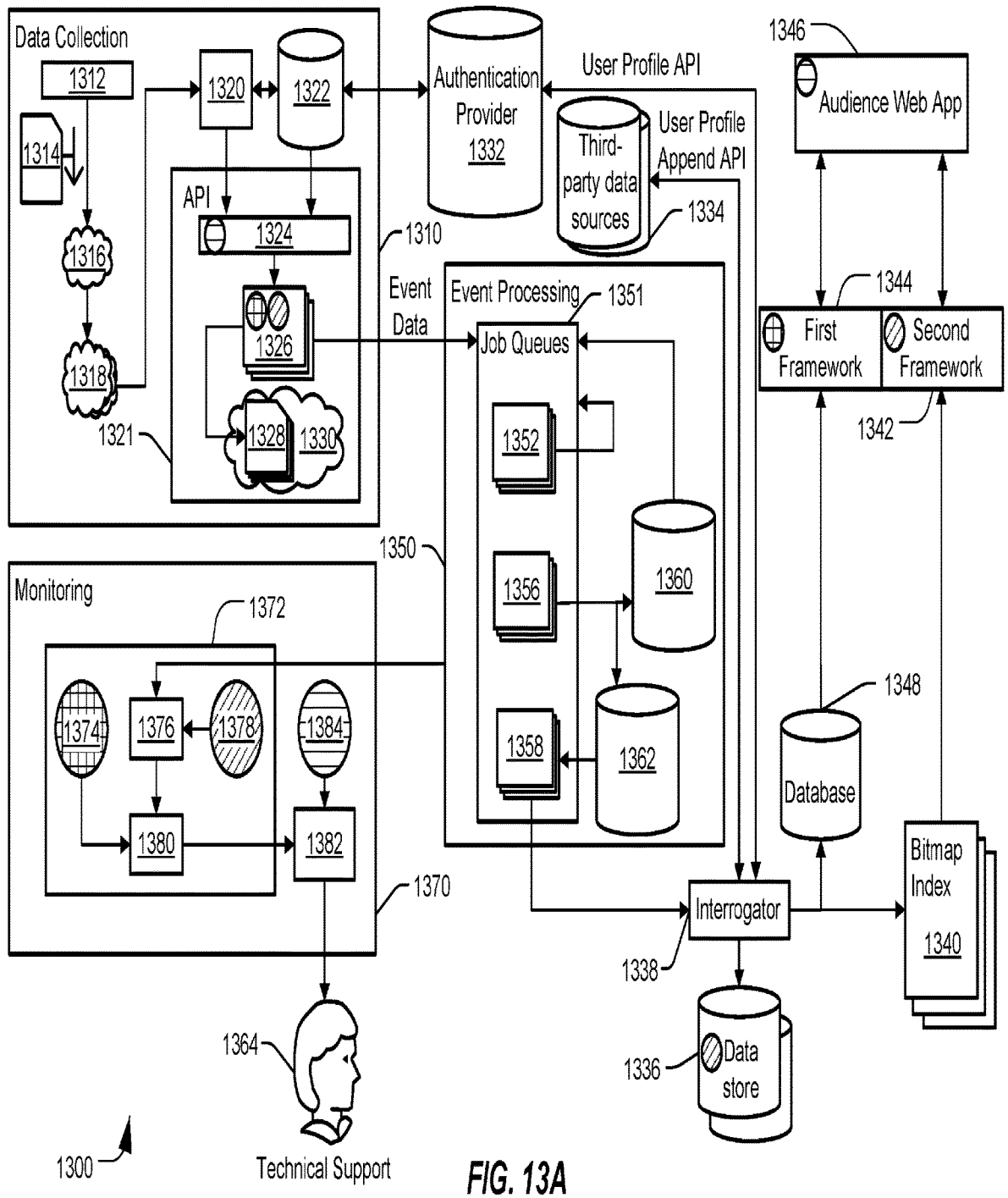
FIGS. 13A, 13B, 13C, and 13D are diagrams to illustrate another particular embodiment of an audience measurement system that is operable to generate and use a bitmap index.
Figure 13B:
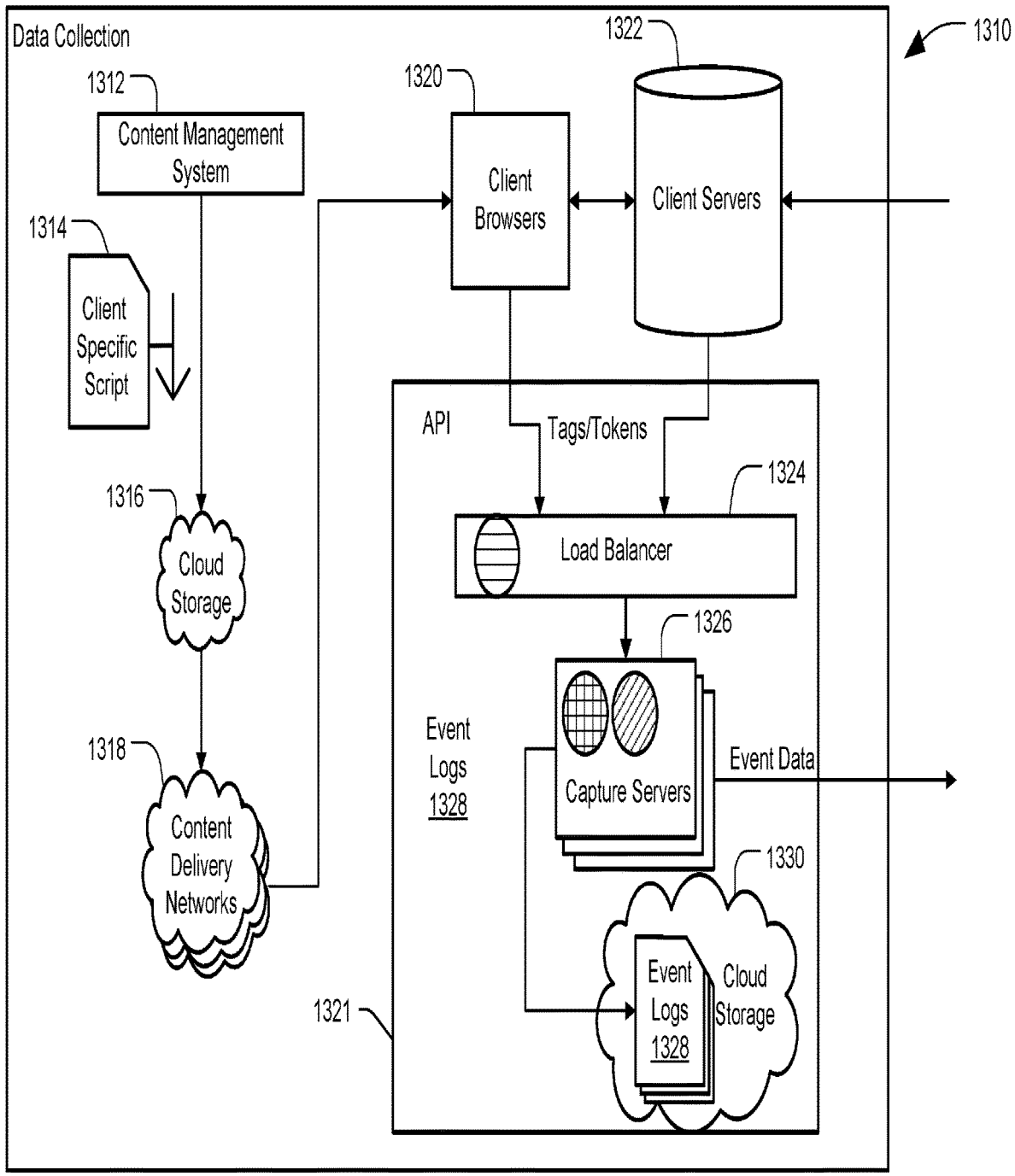
Figure 13C:
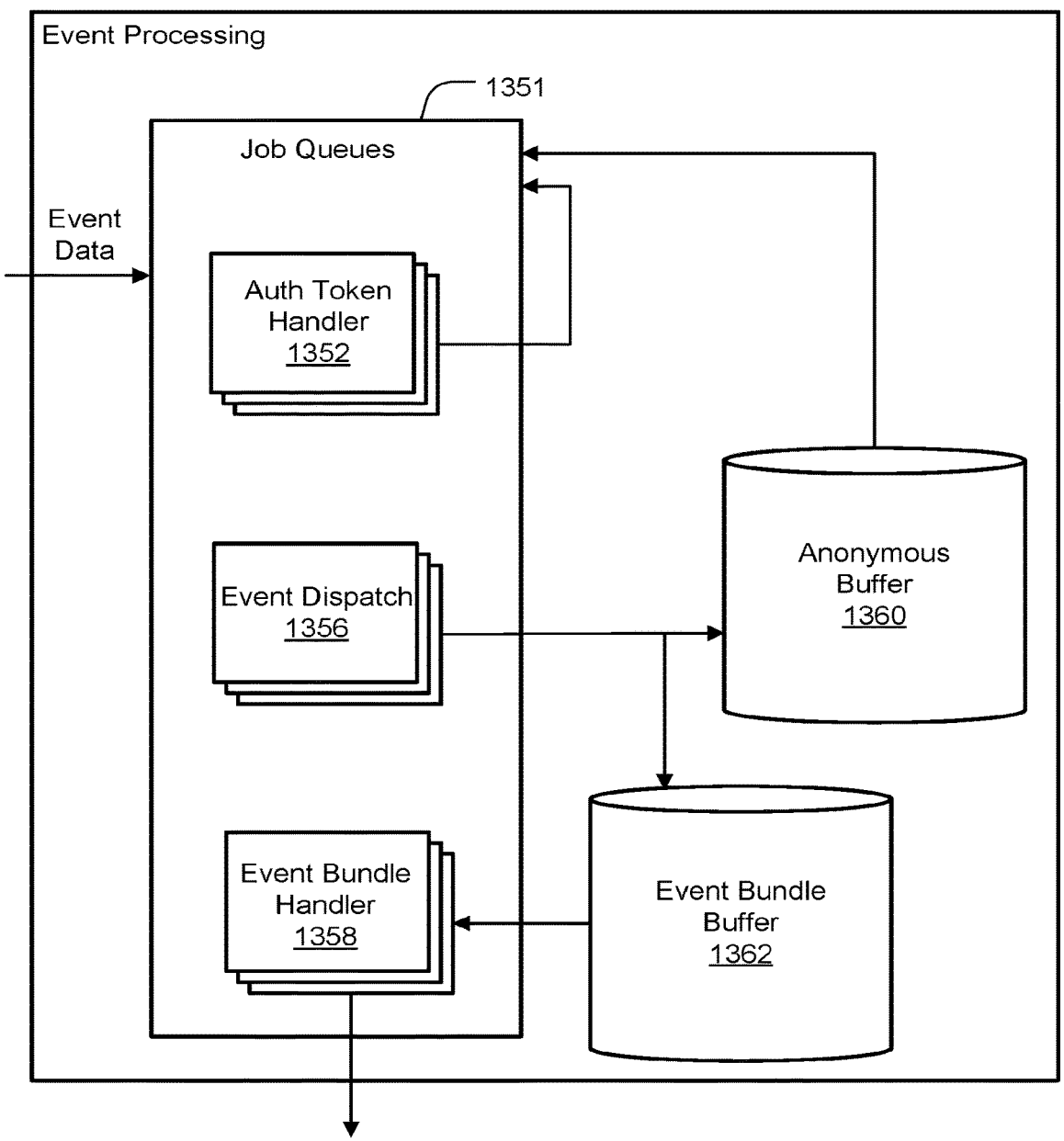
Figure 13D:
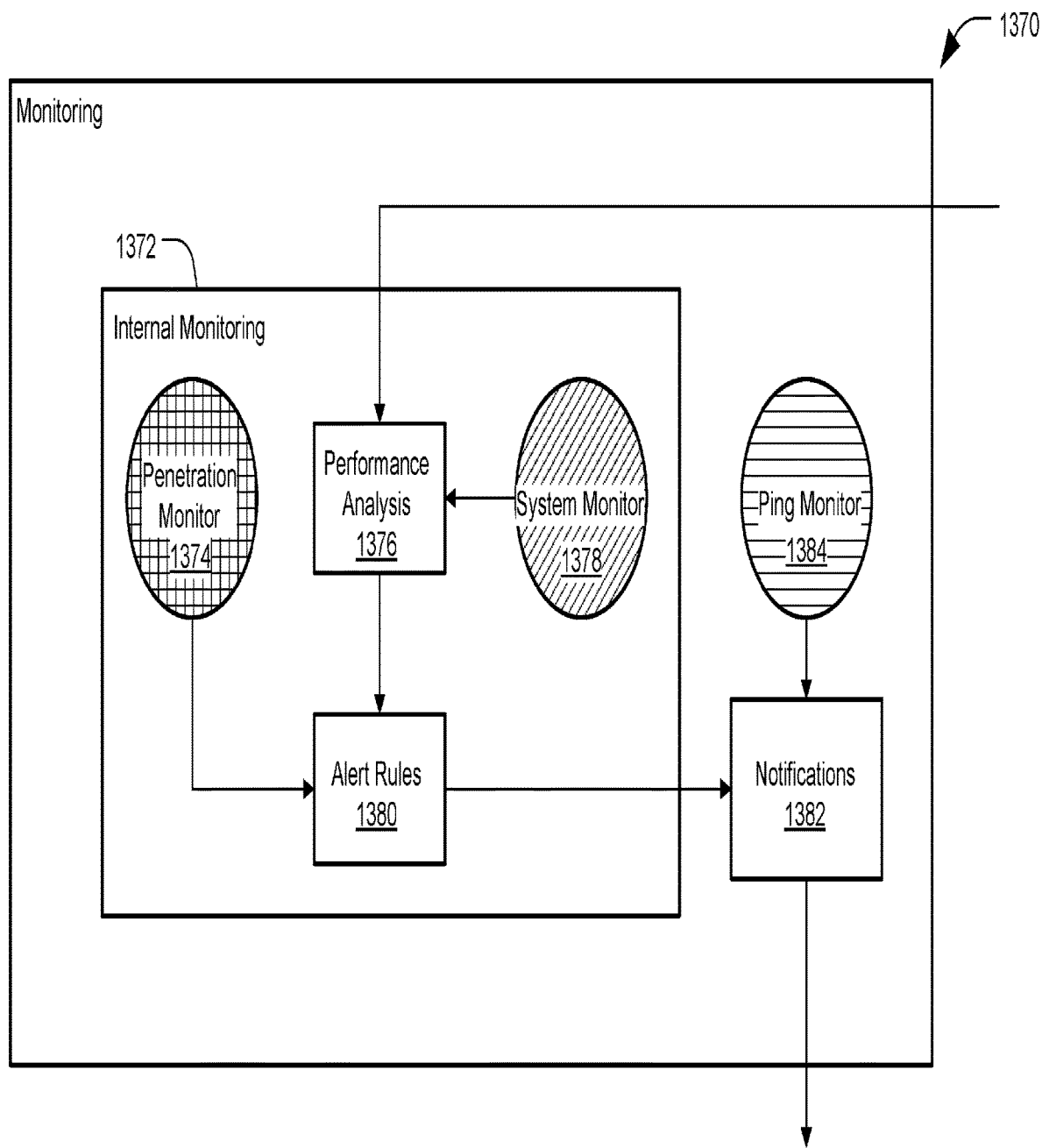

FIG. 13A illustrates another particular embodiment of a system 1300 that is operable to generate and use a bitmap index. The system 1300 includes a data collection tier (e.g., subsystem) 1310, an event processing tier 1350, and a monitoring tier 1370. Components of the data collection tier 1310 are illustrated in further detail in FIG. 13B. Components of the event processing tier 1350 are illustrated in further detail in FIG. 13C. Components of the monitoring tier are illustrated in further detail in FIG. 13D.

The system 1300 includes (or has access to) an authentication provider 1332, third party data sources 1334, an audience web application 1346, a first framework 1344, a second framework 1342, a database 1348, an interrogator 1338, a data store 1336, and a bitmap index 1340. In an illustrative embodiment, the third party data sources 1334 are the third party data sources 1250 of FIG. 12, the event processing tier 1350 and the interrogator 1338 correspond to the data processing module 1244 of FIG. 12, and the bitmap index 1340 is the bitmap index 1248 of FIG. 12.

The data collection tier 1310 includes a content management system (CMS) 1312, cloud storage 1316, content delivery networks 1318, client browsers 1320, and client servers 1322. The data collection tier 1310 may further include an application programming interface (API) 1321. The API 1321 includes a load balancer 1324, capture servers 1326, and cloud storage 1330.

The event processing tier 1350 includes a job queues module 1351, an anonymous buffer 1360, and an event bundle buffer 1362. The job queues module 1351 includes an authentication token handler 1352, an event dispatch 1356, and an event bundle handler 1358. In alternate embodiments, the job queues module 1351 may include more, fewer, and/or different handlers than illustrated in FIG. 13.

The monitoring tier 1370 includes an internal monitoring module 1372, a ping monitor 1384, and a notifications module 1382. The internal monitoring module 1372 includes a penetration monitor 1374, a performance analysis module 1376, a system monitor 1378, and an alert rules module 1380.

During operation, the content management system 1312 may be used to generate a client specific script (e.g., webscript) 1314 for various clients (e.g., media properties). The client specific script 1314 may be stored in the cloud storage 1316 and replicated to the content delivery networks 1318. As audience members register and interact with a media property, the content delivery networks 1318 may deliver the client specific script 1314, along with property content, to the client browsers 1320. Based on the client specific script 1314, the client browsers 1320 may generate tags (e.g., a tag corresponding to a particular user activity, such as watching a video) or tokens (e.g., a social networking registration token). The tags or tokens may be sent to the load balancer 1324. The client servers 1322 may also generate tags or tokens to send to the load balancer 1324 based on user registrations and user activity at media properties. The tags or tokens from the client servers 1322 may be authenticated by the authentication provider 1332.

The load balancer 1324 may send the tags or tokens to the capture servers 1326 based on a load balancing algorithm. The capture servers 1326 may generate event data (e.g., event signals) based on the tags or tokens. The capture servers 1326 may store the event data in event logs 1328 in the cloud storage 1330 and send the event data to the job queues module 1351.

The job queues module 1351 may distribute the event data to different event handler(s) based on the type of the event data. For example, event data including an authentication token may be sent to the authentication token handler 1352. In addition, event data requiring additional information from social media sources may be sent to the authentication token handler 1352. The handler 1352 may perform asynchronous event collection operations based on the received event data. For example, when a new user registers with a media property using a social networking profile, a token may be provided by the data collection tier to the authentication token handler 1352. The handler 1352 may use the token to retrieve demographic and brand affinity data for the user from the user's social networking profile.

Event signals may also be sent to the event dispatch 1356, which determines whether the event signals corresponds to known or unknown users. When event data corresponds to an unknown user, the event dispatch 1356 buffers the event data in the anonymous buffer 1360. After a period of time (e.g., three days), event data from the anonymous buffer 1360 may be sent to the job queues module 1351 to be processed again.

When event data corresponds to a "known" user (e.g., a user that has already been assigned a user ID), the event dispatch 1356 may send the event data to the event bundles buffer 1362. The event bundle handler 1358 may retrieve event data stored in the event bundles buffer 1362 every bundling period (e.g., one hour). The event bundle handler 1358 may bundle event data received each bundling period into an event bundle that is sent to the interrogator 1338.

The interrogator 1338 may parse the event bundle and update the data store 1336, the SQL database 1348, and/or the bitmap index 1340. For example, the interrogator 1338 may perform bitmap index generation and update operations as described herein. In a particular embodiment, the database 1348 corresponds to a profiles database that is accessible the first framework 1344 to the audience web application 1346. For example, the first framework 1344 may be a database-driven framework that is operable to dynamically generate webpages based on data in the database 1348. The audience web application may be operable to generate various graphical user interfaces to analyze the data collected by the system 1300. The bitmap index 1340 may be accessible to the audience web application 1346 via the second framework 1342. In one example, the second framework 1342 supports representational state transfer (REST)-based data access and webpage navigation. Although not shown, in particular embodiments, the data store 1336 may also be accessible to the audience web application 1346.

The monitoring tier 1370 may monitor the various components of the system 1300 during operation to detect errors, bottlenecks, network intrusions, and other issues. For example, the penetration monitor 1374 my collect data indicating unauthorized access to or from the capture servers 1326 and the first framework 1344. The penetration monitor 1374 may provide the data to the alert rules module 1380. Similarly, the system monitor 1378 may collect performance data from the capture servers 1326, from the second framework 1342, and from the data store 1336. The system monitor 1378 may provide the performance data to the performance analysis module 1376, which may analyze the data and send the analyzed data to the alert rules module 1380. The alert rules module 1380 may compare received data to alert rules and, based on the comparison send an alert to the notifications module 1382. For example, the alert rules module 1380 may determine that an intruder has accessed components of the system 1300 or that the system 1300 is not operating at a desired level of efficiency, and may send an alert to the notifications module 1382.

The notifications module 1382 may also receive alerts from the ping monitor 1384. The ping monitor 1384 may monitor the load balancer 1324 and the audience web application 1346 and collect data regarding uptime, downtime, and performance, and provide alerts to the notification module 1382.

The notification module 1382 may send notifications (e.g., via short message service (SMS), e-mail, instant messaging, paging, etc.) to one or more technical support staff members 1364 to enable timely response in the event of errors, performance bottlenecks, network intrusion, etc.

In accordance with various embodiments of the present disclosure, the methods, functions, and modules described herein may be implemented by software programs executable by a computer system. Further, in an exemplary embodiment, implementations can include distributed processing, component/object distributed processing, and parallel processing. Alternatively, virtual computer system processing can be constructed to implement one or more of the methods or functionality as described herein.

Particular embodiments can be implemented using a computer system executing a set of instructions that cause the computer system to perform any one or more of the methods or computer-based functions disclosed herein. A computer system may include a laptop computer, a desktop computer, a mobile phone, a tablet computer, a set-top box, a media player, or any combination thereof. The computer system may be connected, e.g., using a network, to other computer systems or peripheral devices. For example, the computer system or components thereof can include or be included within any one or more devices, modules, and/or components illustrated in FIGS. 1-13. In a networked deployment, the computer system may operate in the capacity of a server or as a client user computer in a server-client user network environment, or as a peer computer system in a peer-to-peer (or distributed) network environment. The term "system" can include any collection of systems or sub-systems that individually or jointly execute a set, or multiple sets, of instructions to perform one or more computer functions.

In a particular embodiment, the instructions can be embodied in a computer-readable or a processor-readable device. The terms "computer-readable device" and "processor-readable device" include a single storage device or multiple storage devices, such as a centralized or distributed database, and/or associated caches and servers that store one or more sets of instructions. The terms "computer-readable device" and "processor-readable device" also include any device that is capable of storing a set of instructions for execution by a processor or that cause a computer system to perform any one or more of the methods or operations disclosed herein. For example, a computer-readable or processor-readable device or storage device may include random access memory (RAM), flash memory, read-only memory (ROM), programmable read-only memory (PROM), erasable programmable read-only memory (EPROM), electrically erasable programmable read-only memory (EEPROM), registers, a hard disk, a removable disk, a disc-based memory (e.g., compact disc read-only memory (CD-ROM)), or any other form of storage device. A computer-readable or processor-readable device is not a signal.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A non-transitory computer readable medium having program instructions stored therein that are executable by a computing system to perform operations comprising:
    storing a bitmap index identifying a plurality of properties for a plurality of entities, wherein the bitmap index includes:
        a first bit string associated with a first of the plurality of properties, wherein a bit at a particular location in the first bit string indicates whether a particular one of the plurality of entities possesses the first property; and
        a first metadata value associated with the particular location, wherein the first metadata value specifies a non-bit value for the particular entity;
    receiving, by the computing system, a query to identify ones of the plurality of entities identified in the bitmap index as possessing the first property; and
    returning a result for the query, wherein the result identifies the particular entity based on the bit at the particular location and includes the first metadata value.

2. The computer readable medium of claim 1, wherein the query requests identification of ones of the plurality of entities that possess the first property and a second of the plurality of properties, and wherein the operations further comprise:
    implementing the query by performing a logical-and operation of the first bit string and a second bit string included in the bitmap index, wherein the second bit string is associated with the second property; and
    returning the result identifying the particular entity based on the bit at the particular location in the first bit string and another bit at the particular location in the second bit string.

3. The computer readable medium of claim 1, wherein the query requests identification of ones of the plurality of entities that possess the first property or possess a second of the plurality of properties, and wherein the operations further comprise:
    implementing the query by performing a logical-or operation of the first bit string and a second bit string included in the bitmap index, wherein the second bit string is associated with the second property.

4. The computer readable medium of claim 1, wherein the first metadata value includes a string identifying the particular entity.

5. The computer readable medium of claim 1, wherein the first metadata value includes a tuple that identifies a particular data type and a value of the particular data type.

6. The computer readable medium of claim 1, wherein the bitmap index includes a second metadata value associated with an entirety of the first bit string; and wherein the operations further comprise:
    returning the second metadata value in response to a query associated with the first property and the plurality of entities.

7. The computer readable medium of claim 6, wherein the second metadata value includes a count value identifying a number of bits set in the first bit string for ones of the plurality of entities possessing the first property.

8. The computer readable medium of claim 7, wherein the bitmap index includes a plurality of bit strings associated with the plurality of properties, wherein the operations further comprise:
    sorting the plurality of bits strings based on count values included in the bitmap index.

9. The computer readable medium of claim 1, wherein the bitmap index indexes data maintained in an external data source; and
    wherein the result of the query is returned without accessing the external data source.

10. The computer readable medium of claim 1, wherein the operations further comprise:
    distributing the bitmap index across a plurality of storage devices, wherein a first portion of the first bit string is stored in a first of the plurality of storage devices, and wherein a second portion of the first bit string is stored in a second of the plurality of storage devices.

11. A method, comprising:

submitting, by a computing device and to a computing system, a query to identify ones of a plurality of entities that possess a first property, wherein the computing system maintains a bitmap index identifying a plurality of properties for the plurality of entities, wherein the bitmap index includes a first bit string associated with the first property, wherein a bit at a particular location in the first bit string indicates whether a particular one of the plurality of entities possesses the first property; and receiving, by the computing device, a result of the query, wherein the result identifies the particular entity based on the bit at the particular location and includes a first metadata value included in the bitmap index and associated with the particular entity.

12. The method of claim 11, wherein the query requests identification of ones of the plurality of entities that possess the first property and a second of the plurality of properties; and wherein the computing system determines the result by performing a logical operation of the first bit string and a second bit string included in the bitmap index, wherein the second bit string is associated with the second property.

13. The method of claim 11, wherein the first metadata value includes a string associated with the particular entity.

14. The method of claim 11, wherein the first metadata value includes a tuple associated with the particular entity.

15. The method of claim 11, wherein the bitmap index indexes data maintained in a data source distinct from the bitmap index; and wherein the result is returned without the computing system accessing the data source.

16. A non-transitory computer readable medium having program instructions stored therein that are executable by a computing system to perform operations comprising:

storing a bitmap table identifying a plurality of properties for a plurality of entities, wherein the bitmap table includes:

in a first dimension of bitmap table, a first bit string associated with a first of the plurality of properties, wherein a bit at a particular location in the first bit string indicates whether a particular one of the plurality of entities possesses the first property; and a first metadata value that specifies a non-bit value associated with the first dimension;

receiving, by the computing system, a query to identify ones of the plurality of entities identified in the bitmap table as possessing the first property; and returning a result for the query, wherein the result identifies the particular entity based on the bit at the particular location and includes the first metadata value.

17. The computer readable medium of claim 16, wherein the operations further comprise:

performing a logical operation of the first bit string and a second bit string included in the first dimension of the bitmap table, wherein the second bit string is associated with a second property identified by the query; and identifying the particular entity in the result based on the bit at the particular location in the first bit string and another bit at the particular location in the second bit string.

18. The computer readable medium of claim 16, wherein the first metadata value includes a count value indicative of a number of bits set in the first bit string.

19. The computer readable medium of claim 18, wherein the count value is a count sort index indicative of the number of bits set in the first bit string relative to other bit strings in the bitmap table.

20. The computer readable medium of claim 16, wherein the result includes a second metadata value included in the bitmap table, wherein the second metadata value specifies a non-bit value for the particular entity.

* * * * *